(12) United States Patent
Kokado et al.

(10) Patent No.: US 12,284,453 B2
(45) Date of Patent: Apr. 22, 2025

(54) PHOTOELECTRIC CONVERSION DEVICE, IMAGING SYSTEM, MOVABLE OBJECT, EQUIPMENT, SIGNAL PROCESSING DEVICE AND SIGNAL PROCESSING METHOD

(71) Applicant: CANON KABUSHIKI KAISHA, Tokyo (JP)

(72) Inventors: Tomoya Kokado, Kanagawa (JP); Hiroaki Taniguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 179 days.

(21) Appl. No.: 18/312,394

(22) Filed: May 4, 2023

(65) Prior Publication Data

US 2023/0370737 A1    Nov. 16, 2023

(30) Foreign Application Priority Data

May 10, 2022  (JP) .................................. 2022-077472
Feb. 22, 2023  (JP) .................................. 2023-026048

(51) Int. Cl.
*H04N 25/616*   (2023.01)
*H04N 25/65*    (2023.01)
*H04N 25/77*    (2023.01)

(52) U.S. Cl.
CPC ........... *H04N 25/616* (2023.01); *H04N 25/65* (2023.01); *H04N 25/77* (2023.01)

(58) Field of Classification Search
CPC .... H04N 25/616; H04N 25/671; H04N 25/63; H04N 25/78; H04N 25/77; H04N 25/677; H04N 25/65

USPC .......................................................... 348/308
See application file for complete search history.

(56) References Cited

U.S. PATENT DOCUMENTS

| 8,174,600 B2* | 5/2012 | Ogura | H04N 25/67 |
| | | | 348/308 |
| 8,264,580 B2* | 9/2012 | Mori | H04N 25/633 |
| | | | 348/308 |
| 8,379,118 B2* | 2/2013 | Komori | H04N 25/677 |
| | | | 348/241 |

(Continued)

FOREIGN PATENT DOCUMENTS

| JP | H05153428 A | 6/1993 |
| JP | 2000138867 A | 5/2000 |

(Continued)

*Primary Examiner* — Pritham D Prabhakher
(74) *Attorney, Agent, or Firm* — Canon U.S.A., Inc. IP Division

(57) ABSTRACT

A photoelectric conversion device includes a plurality of pixels arranged to form a plurality of columns, a plurality of column circuits provided corresponding to the plurality of columns and each configured to read out a signal acquired by a pixel of the corresponding column, a first processing unit configured to perform an arithmetic processing on each of the signals output from the plurality of column circuits, the arithmetic processing including a processing of reducing a gain error component of the column circuit generated in the column circuit and superimposed on the signal, and a second processing unit configured to perform an arithmetic processing of reducing a noise generated in the pixel and superimposed on the signal on the signals processed by the first processing unit.

33 Claims, 20 Drawing Sheets

(56) References Cited

U.S. PATENT DOCUMENTS

| | | | | |
|---|---|---|---|---|
| 8,854,507 B2* | 10/2014 | Joboji | ................ | H04N 25/672 |
| | | | | 348/241 |
| 9,736,410 B2* | 8/2017 | Uchida | ................ | H04N 25/704 |
| 9,838,637 B2* | 12/2017 | Muto | ................ | H01L 27/14634 |
| 9,961,255 B2* | 5/2018 | Sambonsugi | .......... | H04N 25/63 |
| 11,070,755 B2* | 7/2021 | Takahashi | .............. | H04N 25/75 |
| 11,212,471 B2* | 12/2021 | Moue | ................ | H04N 25/75 |
| 11,368,644 B2* | 6/2022 | Etou | ................ | H01L 27/14636 |
| 2008/0239124 A1 | 10/2008 | Mori | | |
| 2010/0002114 A1* | 1/2010 | Ogura | ................ | H04N 25/78 |
| | | | | 348/301 |
| 2011/0115958 A1* | 5/2011 | Koseki | ................ | H04N 25/778 |
| | | | | 315/297 |
| 2011/0304751 A1 | 12/2011 | Joboji | | |
| 2012/0092533 A1 | 4/2012 | Komori | | |
| 2014/0368696 A1 | 12/2014 | Uchida | | |
| 2017/0118428 A1 | 4/2017 | Muto | | |
| 2017/0230569 A1* | 8/2017 | Sambonsugi | .......... | H04N 25/63 |
| 2019/0068902 A1* | 2/2019 | Nishino | ................ | H04N 25/617 |
| 2020/0314370 A1 | 10/2020 | Takahashi | | |
| 2020/0366863 A1 | 11/2020 | Etou | | |
| 2021/0185250 A1* | 6/2021 | Moue | ................ | H04N 25/75 |
| 2021/0281737 A1* | 9/2021 | Iwase | ................ | H04N 23/76 |

FOREIGN PATENT DOCUMENTS

| | | |
|---|---|---|
| JP | 2006060628 A | 3/2006 |
| JP | 2006295620 A | 10/2006 |
| JP | 2007336374 A | 12/2007 |
| JP | 2008271186 A | 11/2008 |
| JP | 2012235534 A | 11/2012 |
| JP | 2015002531 A | 1/2015 |
| JP | 2018110353 A | 7/2018 |
| JP | 2019022096 A | 2/2019 |
| JP | 2020167544 A | 10/2020 |
| JP | 2021197648 | 12/2021 |

* cited by examiner

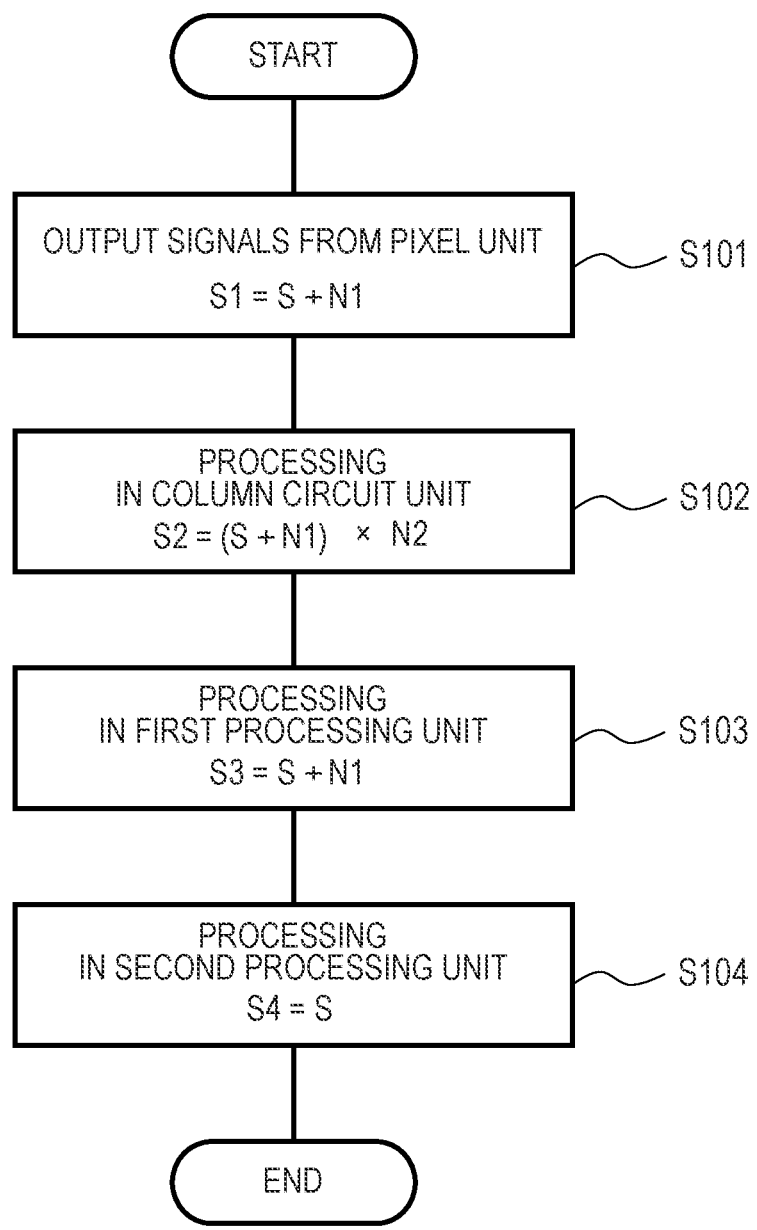

PHOTOELECTRIC CONVERSION DEVICE, IMAGING SYSTEM, MOVABLE OBJECT, EQUIPMENT, SIGNAL PROCESSING DEVICE AND SIGNAL PROCESSING METHOD

BACKGROUND

Technical Field

The aspect of the embodiments relates to a photoelectric conversion device, an imaging system, a movable object, equipment, a signal processing device, and a signal processing method.

Description of the Related Art

In a photoelectric conversion device typified by an imaging device such as a CMOS sensor, it is important to reduce noise caused by a pixel circuit or a readout circuit in order to obtain a higher quality image. Japanese Patent Application Laid-Open No. 2015-002531 discloses a technology for reducing noise of an offset component and noise of a gain component caused by a readout circuit. Japanese Patent Application Laid-Open No. H05-153428 discloses a technology for reducing noise caused by a dark current generated in a pixel circuit.

However, in the case where the corrections for reducing the noise caused by the pixel circuit and the readout circuit are performed by using the techniques described in Japanese Patent Application Laid-Open No. 2015-002531 and Japanese Patent Application Laid-Open No. H05-153428, the noise cannot be appropriately removed and the correction residue may occur, and the image quality may be decreased.

SUMMARY

According to an aspect of the embodiments, there are provided a photoelectric conversion device including a plurality of pixels arranged to form a plurality of columns, a plurality of column circuits provided corresponding to the plurality of columns and each configured to read out a signal acquired by a pixel of the corresponding column, a first processing unit configured to perform an arithmetic processing on each of the signals output from the plurality of column circuits, the arithmetic processing including a processing of reducing a gain error component of the column circuit generated in the column circuit and superimposed on the signal, and a second processing unit configured to perform an arithmetic processing of reducing a noise generated in the pixel and superimposed on the signal on the signals processed by the first processing unit.

According to another aspect of the embodiments, there is provided a signal processing device for processing a signal output from a photoelectric conversion device including a plurality of pixels arranged to form a plurality of columns, and a plurality of column circuits provided corresponding to the plurality of columns and each configured to read out a signal acquired by a pixel of the corresponding column, the signal processing device including a first processing unit configured to perform an arithmetic processing on each of the signals output from the plurality of column circuits of the photoelectric conversion device, the arithmetic processing including a processing of reducing a gain error component of the column circuit generated in the column circuit and superimposed on the signal, and a second processing unit configured to perform an arithmetic processing of reducing a noise generated in the pixel and superimposed on the signal on the signals processed by the first processing unit.

According to still another aspect of the embodiments, there is provided a signal processing method for processing a signal output from a photoelectric conversion device including a plurality of pixels arranged to form a plurality of columns, and a plurality of column circuits provided corresponding to the plurality of columns and each configured to read out a signal acquired by a pixel of the corresponding column, the method including performing a first processing including an arithmetic processing on each of the signals output from the plurality of column circuits of the photoelectric conversion device, the arithmetic processing including a processing of reducing a gain error component of the column circuit generated in the column circuit and superimposed on the signal, and performing a second processing including an arithmetic processing of reducing a noise generated in the pixel and superimposed on the signal on the signals processed by the first processing unit.

Further features of the disclosure will become apparent from the following description of exemplary embodiments with reference to the attached drawings.

BRIEF DESCRIPTION OF THE DRAWINGS

FIG. 5 is a flowchart illustrating a pixel signal correction method in the imaging device according to the first embodiment of the present invention.

DESCRIPTION OF THE EMBODIMENTS

Preferred embodiments of the present invention will now be described in detail in accordance with the accompanying drawings.

In each of the embodiments described below, an imaging device will be mainly described as an example of a photoelectric conversion device. However, the embodiments are not limited to the imaging device, and may be applied to other examples of the photoelectric conversion device. Other examples of the photoelectric conversion device include, for example, a distance measuring device (a device for, e.g., measuring a distance by using focus detection or TOF (Time Of Flight)) and a photometric device (a device for measuring an amount of incident light).

First Embodiment

Figure 1:
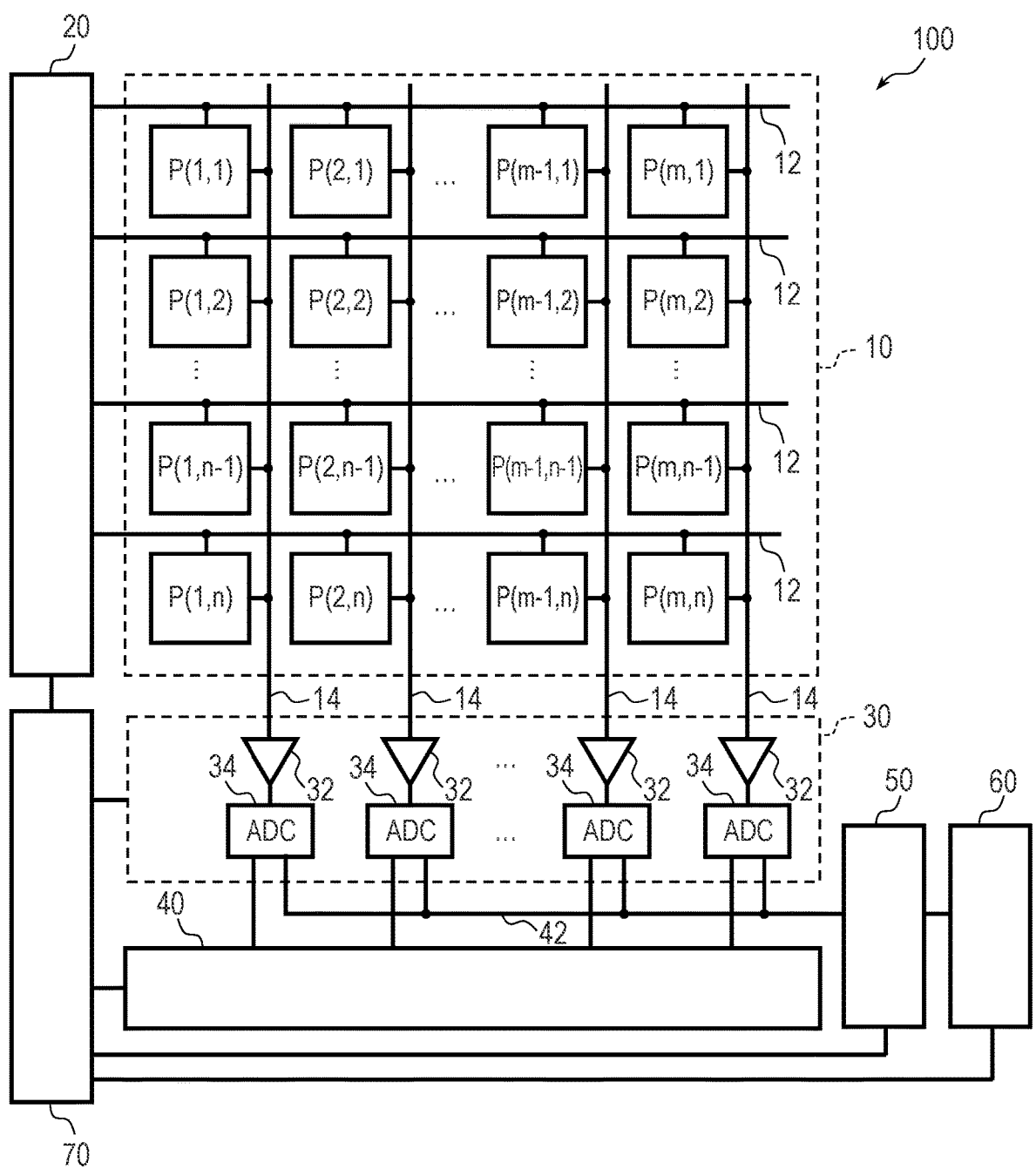
FIG. 1 is a block diagram illustrating a schematic configuration of an imaging device according to a first embodiment of the present invention.
Figure 2:
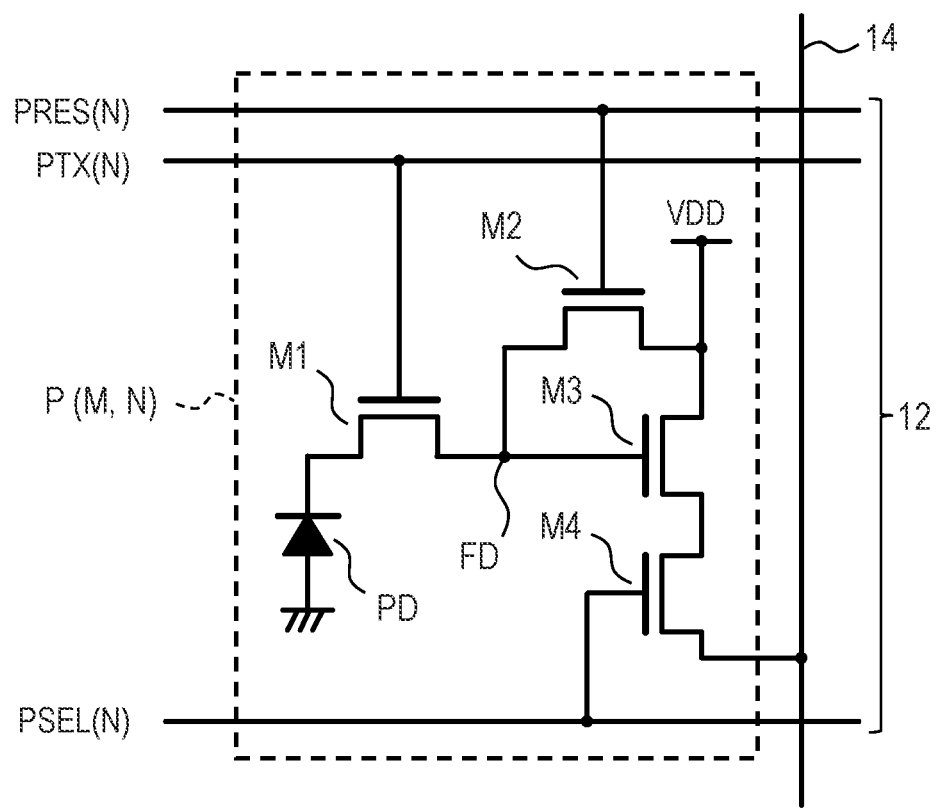
FIG. 2 is a circuit diagram illustrating a configuration example of a pixel in the imaging device according to the first embodiment of the present invention.
Figure 3:
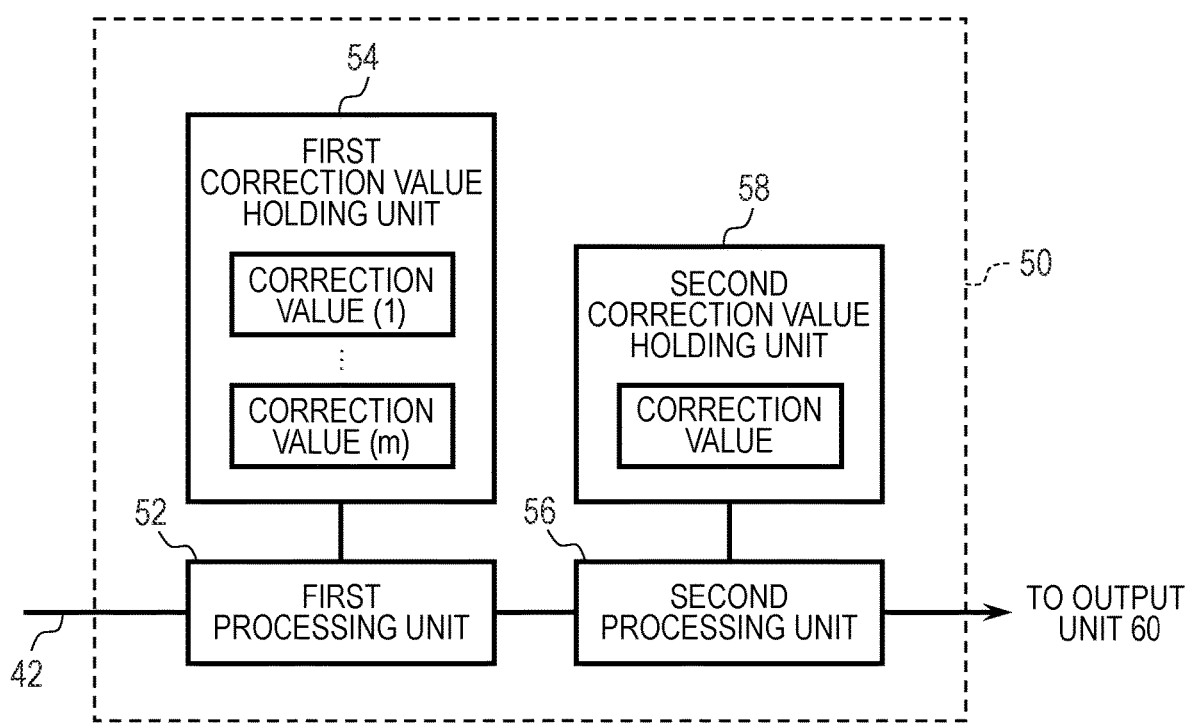
FIG. 3 is a block diagram illustrating a schematic configuration of a signal processing unit in the imaging device according to the first embodiment of the present invention.
Figure 4:
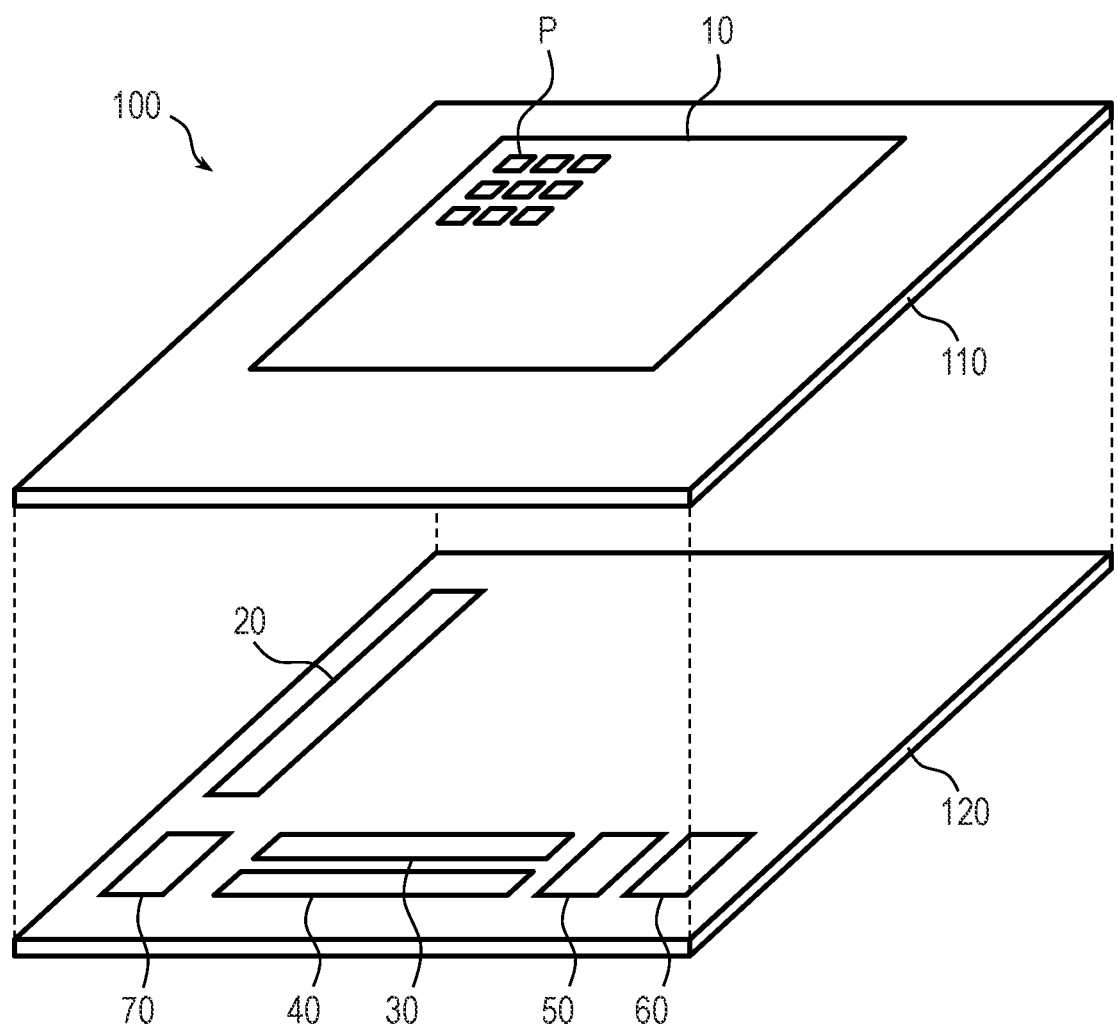
FIG. 4 is a schematic diagram illustrating a configuration example of the imaging device according to the first embodiment of the present invention.

A schematic configuration of an imaging device according to a first embodiment of the present invention will be described with reference to FIG. 1 to FIG. 4. FIG. 1 is a block diagram illustrating a schematic configuration of the imaging device according to the present embodiment. FIG. 2 is a circuit diagram illustrating a configuration example of a pixel in the imaging device according to the present embodiment. FIG. 3 is a block diagram illustrating a schematic configuration of a signal processing unit in the imaging device according to the present embodiment. FIG. 4 is a schematic diagram illustrating a configuration example of the imaging device according to the present embodiment.

As illustrated in FIG. 1, the imaging device 100 according to the present embodiment includes a pixel unit 10, a vertical scanning circuit unit 20, a column circuit unit 30, a horizontal scanning circuit unit 40, a signal processing unit 50, an output unit 60, and a control unit 70.

In the pixel unit 10, a plurality of pixels P each including a photoelectric conversion unit are two-dimensionally arranged so as to form a plurality of rows and a plurality of columns. Each of the plurality of pixels P outputs a pixel signal corresponding to an amount of light incident on the photoelectric conversion unit. FIG. 1 illustrates a pixel unit 10 including a plurality of pixels P arranged in a matrix of m-number of columns×n-number of rows, and coordinates represented by (column number, row number) are added to the symbol P of each pixel. In this specification, a direction in which each row extends (a row direction) is defined as a horizontal direction, and a direction in which each column extends (a column direction) is defined as a vertical direction. It is assumed that the row number of the head row is the first row and the column number of the head column is the first column.

The number of pixels P constituting the pixel unit 10 is not particularly limited. For example, the pixel unit 10 may be constituted by a plurality of pixels P arranged in an array of several thousand columns×several thousand rows as in a general digital camera. Alternatively, the pixel unit 10 may be constituted by a plurality of pixels P arranged in one row or one column. Alternatively, the pixel unit 10 may be constituted by one pixel P. In addition, in the pixel unit 10, in addition to effective pixels that output pixel signals according to the amount of incident light, optical black pixels in which the photoelectric conversion unit is shielded from light, dummy pixels that do not output signals, and the like may be arranged.

In each row of the pixel unit 10, a control line 12 is arranged extending in the row direction. Each of the control lines 12 is connected to each of the pixels P arranged in the row direction, and forms a common signal line for these pixels P. Each of the control lines 12 may include a plurality of signal lines. The control lines 12 are connected to the vertical scanning circuit unit 20.

In each column of the pixel unit 10, a vertical output line 14 is arranged so as to extend in the column direction. Each of the vertical output lines 14 is connected to the pixels P arranged in the column direction, and forms a common signal line for these pixels P. The vertical output lines 14 are connected to the column circuit unit 30.

The vertical scanning circuit unit 20 is a control circuit having a function of receiving a control signal supplied from the control unit 70, generating a control signal for driving the pixel P, and supplying the generated control signal to the pixel P via the control line 12. A logic circuit such as a shift register or an address decoder may be used for the vertical scanning circuit unit 20. The vertical scanning circuit unit 20 supplies a control signal to the control line 12 of each row to drive the pixels P of the pixel unit 10 in units of rows. The signals read out from the pixels P in units of rows are input to the column circuit unit 30 via the vertical output lines 14 arranged in each column of the pixel unit 10.

The column circuit unit 30 includes a plurality of column circuits provided corresponding to each column of the pixel unit 10. Each of the plurality of column circuits is a readout circuit that reads out a pixel signal acquired by a pixel P in a corresponding column, and includes an amplifier 32 and an ADC (AD conversion circuit) 34. The amplifier 32 amplifies the pixel signal output from the pixel unit 10 via the vertical output line 14 of the corresponding column with a predetermined gain and outputs the amplified pixel signal. The ADC 34 converts the pixel signal output from the amplifier 32 of the corresponding column from an analog signal to a digital signal. The ADC 34 has a memory unit, and holds the pixel signal (image data) converted into the digital signal in the memory unit.

The horizontal scanning circuit unit 40 is a control circuit having a function of receiving a control signal supplied from the control unit 70, generating a signal for reading out the pixel signal held by the column circuit unit 30, and supplying the generated signal to the ADC 34 of each column. A control line of the horizontal scanning circuit unit 40 provided corresponding to each column of the pixel unit 10 is connected to the ADC 34 of the corresponding column. The horizontal scanning circuit unit 40 sequentially scans the ADCs 34 of the respective columns of the column circuit unit 30, and outputs the pixel signals held in the respective columns to the signal processing unit 50 via the horizontal output line 42. A logic circuit such as a shift register or an address decoder may be used for the horizontal scanning circuit unit 40.

The signal processing unit 50 has a function of performing predetermined signal processing on the pixel signals transferred from the column circuit unit 30. The signal processing unit 50 has at least a function of performing correction for reducing noise generated in the pixel unit 10 and a function of performing correction for reducing noise generated in the column circuit unit 30. Examples of other processing that may be included in the signal processing unit 50 include various kinds of arithmetic processing, amplification processing, and correction processing using CDS (Correlated Double Sampling). Details of the signal processing unit 50 will be described later.

The output unit 60 includes an external interface circuit and outputs the pixel signals processed by the signal processing unit 50 to the outside of the imaging device 100. The external interface circuit included in the output unit 60 is not particularly limited. For example, SerDes (SERializer/DE-Serializer) transmission circuits such as LVDS (Low Voltage Differential Signaling) circuit and SLVS (Scalable Low Voltage Signaling) circuit may be applied to the external interface circuit.

The control unit 70 is a control circuit that generates control signals for controlling operations of the vertical scanning circuit unit 20, the column circuit unit 30, the horizontal scanning circuit unit 40, the signal processing unit 50, and the output unit 60, and supplies the generated control signals to each functional block. Note that the control signals for controlling the operations of the vertical scanning circuit unit 20, the column circuit unit 30, the horizontal scanning circuit unit 40, the signal processing unit 50, and the output unit 60 are not necessarily supplied from the control unit 70, and at least a part of the control signals may be supplied from the outside of the imaging device 100.

Next, a configuration example of the pixel P in the imaging device according to the present embodiment will be described with reference to FIG. 2. FIG. 2 illustrates the pixel P (M, N) arranged in the M-th column and the N-th row among the plurality of pixels P constituting the pixel unit 10. Here, M is an integer of 1 to m, and N is an integer of 1 to n. The other pixels P constituting the pixel unit 10 may have the same circuit configuration as the pixels P (M, N).

For example, as illustrated in FIG. 2, the pixel P (M, N) may include a photoelectric conversion element PD, a transfer transistor M1, a reset transistor M2, an amplifier transistor M3, and a select transistor M4. The pixel P (M, N) may further include a microlens and a color filter arranged on an optical path until the incident light is guided to the photoelectric conversion element PD. The microlens collects incident light on the photoelectric conversion element PD. The color filter selectively transmits light of a predetermined color.

The photoelectric conversion element PD is, for example, a photodiode. The photoelectric conversion element PD has an anode connected to a reference voltage node and a cathode connected to a source of the transfer transistor M1. A drain of the transfer transistor M1 is connected to a source of the reset transistor M2 and a gate of the amplifier transistor M3. A node FD to which the drain of the transfer transistor M1, the source of the reset transistor M2, and the gate of the amplifier transistor M3 are connected is a so-called floating diffusion. The floating diffusion has a capacitance component (floating diffusion capacitance) and functions as a charge holding portion. The floating diffusion capacitance may include a p-n junction capacitance and an interconnection capacitance. A drain of the reset transistor M2 and a drain of the amplifier transistor M3 are connected to a node to which a power supply voltage (voltage VDD) is supplied. A source of the amplifier transistor M3 is connected to a drain of the select transistor M4. A source of the select transistor M4 is connected to the vertical output line 14.

In the circuit configuration of FIG. 2, the control line 12 of each row includes three signal lines including a signal line connected to the gate of the transfer transistor M1, a signal line connected to the gate of the reset transistor M2, and a signal line connected to the gate of the select transistor M4. A control signal PTX (N) is supplied from the vertical scanning circuit unit 20 to the gate of the transfer transistor M1 of the pixel P of the N-th row. A control signal PRES (N) is supplied from the vertical scanning circuit unit 20 to the gate of the reset transistor M2 of the pixel P of the N-th row. A control signal PSEL (N) is supplied from the vertical scanning circuit unit 20 to the gates of the select transistors M4 of the pixels P in the N-th row. When each transistor is formed of an n-channel MOS transistor, when a high-level control signal is supplied from the vertical scanning circuit unit 20, the corresponding transistor is turned on. When a low-level control signal is supplied from the vertical scanning circuit unit 20, the corresponding transistor is turned off.

In the present embodiment, a description will be given assuming a case where electrons are used as a signal charge among electron-hole pairs generated in the photoelectric conversion element PD by light incidence. When electrons are used as the signal charge, each transistor included in the pixel P may be formed of an n-channel MOS transistor. However, the signal charge is not limited to electrons, and holes may be used as the signal charge. When holes are used as the signal charge, the conductivity type of each transistor is opposite to that described in this embodiment. Note that the term "source" and "drain" of the MOS transistor may vary depending on the conductivity type of the transistor or the target function. Some or all of names of the source and the drain used in the present embodiment are sometimes referred to as reverse names.

The photoelectric conversion element PD converts (photoelectrically converts) incident light into charge of an amount corresponding to an amount of the incident light, and accumulates the generated charge. The transfer transistor M1 transfers charge held in the photoelectric conversion element PD to the node FD by turning on. The charge transferred from the photoelectric conversion element PD is held in the capacitance component (floating diffusion capacitance) of the node FD. As a result, the node FD becomes a potential corresponding to an amount of charge transferred from the photoelectric conversion element PD by the charge-voltage conversion by the floating diffusion capacitor.

The select transistor M4 connects the amplifier transistor M3 to the vertical output line 14 by turning on. The amplifier transistor M3 is configured such that a voltage VDD is supplied to the drain and a bias current is supplied from a current source (not illustrated) to the source via the select transistor M4, and constitutes an amplifier unit (source follower circuit) having the gate as an input node. Accordingly, the amplifier transistor M3 outputs a signal based on the voltage of the node FD to the vertical output line 14 via the select transistor M4.

The reset transistor M2 has a function of controlling supply of a voltage (voltage VDD) for resetting the node FD serving as a charge holding unit to the FD node. The reset transistor M2 resets the node FD to a voltage corresponding to the voltage VDD by turning on. At this time, by simultaneously turning on the transfer transistor M1, the photoelectric conversion element PD may be reset to a voltage corresponding to the voltage VDD.

By appropriately controlling the transfer transistor M1, the reset transistor M2, and the select transistor M4, a signal corresponding to the reset voltage of the node FD and a signal corresponding to an amount of incident light to the photoelectric conversion element PD are read out from each pixel P. Hereinafter, a signal corresponding to the reset voltage of the node FD is referred to as a noise signal (N-signal), and a signal corresponding to the amount of incident light to the photoelectric conversion element PD is referred to as a photoelectric conversion signal (S-signal).

Next, a configuration example of the signal processing unit 50 in the imaging device according to the present embodiment will be described with reference to FIG. 3. As illustrated in FIG. 3, the signal processing unit 50 includes a first processing unit 52, a first correction value holding unit 54, a second processing unit 56, and a second correction value holding unit 58. The first processing unit 52 is connected to the horizontal output line 42, the first correction value holding unit 54, and the second processing unit 56. The second processing unit 56 is connected to the second correction value holding unit 58 and the output unit 60.

The first processing unit 52 performs arithmetic processing for reducing the noise of the gain component generated in the column circuit unit 30 on the pixel signal received via the horizontal output line 42 by using the correction value held in the first correction value holding unit 54. The second processing unit 56 performs arithmetic processing for reducing the noise of the offset component generated in the pixel unit 10 on the pixel signal processed by the first processing unit 52, using the correction value held in the second correction value holding unit 58. The pixel signals processed by the second processing unit 56 are output to the outside of the imaging device 100 via the output unit 60.

The first correction value holding unit 54 and the second correction value holding unit 58 may be configured by a volatile storage medium such as a flip-flop or an SRAM (Static Random Access Memory). In the first correction value holding unit 54, m-number of correction values corresponding to each column of the pixel unit 10 are held in advance. At least one correction value is previously held in the second correction value holding unit 58. These correction values may be generated inside the imaging device 100 and written in the first correction value holding unit 54 and the second correction value holding unit 58, or may be generated outside the imaging device 100 and written in the first correction value holding unit 54 and the second correction value holding unit 58. Generation of a correction value outside the imaging device 100 has an advantage that an appropriate correction value may be generated without being limited by the circuit area. The number of correction values held in each of the first correction value holding unit 54 and the second correction value holding unit 58 may be set independently of each other according to a configuration of the pixel P or the column circuit, a size of a circuit area, and the like.

The first correction value holding unit 54 and the second correction value holding unit 58 are not necessarily provided inside the imaging device 100, and may be provided outside the imaging device 100. By providing the first correction value holding unit 54 and the second correction value holding unit 58 outside the imaging device 100, a desired first correction value holding unit 54 and the second correction value holding unit 58 may be constructed without being limited in memory capacity.

The imaging device 100 according to the present embodiment may be formed on one substrate, or may be configured as a stacked-type imaging device in which a plurality of substrates is stacked. In the latter case, for example, as illustrated in FIG. 4, the imaging device may be configured as a stacked-type imaging device in which the pixel substrate 110 and the circuit substrate 120 are stacked and electrically connected. The pixel unit 10 among the components of the imaging device 100 may be disposed on the pixel substrate 110. Further, among the components of the imaging device 100, the vertical scanning circuit unit 20, the column circuit unit 30, the horizontal scanning circuit unit 40, the signal processing unit 50, the output unit 60, and the control unit 70 may be disposed on the circuit substrate 120.

By configuring the imaging device 100 in this manner, when the imaging device 100 is manufactured, an appropriate manufacturing process may be selected for each of the analog unit including the pixel unit 10 and the logic unit including the signal processing unit 50. Thereby, it is possible to realize an imaging device in which the characteristics of each unit of the imaging device 100 are independently improved and thus the image quality is improved.

By providing both the first processing unit 52 and the second processing unit 56 of the signal processing unit 50 on the circuit substrate 120, the dynamic range of the signal components in the image data may be enlarged. In addition, by stacking the pixel substrate 110 and the circuit substrate 120, the circuit area of the signal processing unit 50 may be increased, which is suitable for an imaging device having a single-layer structure.

Figure 6A:
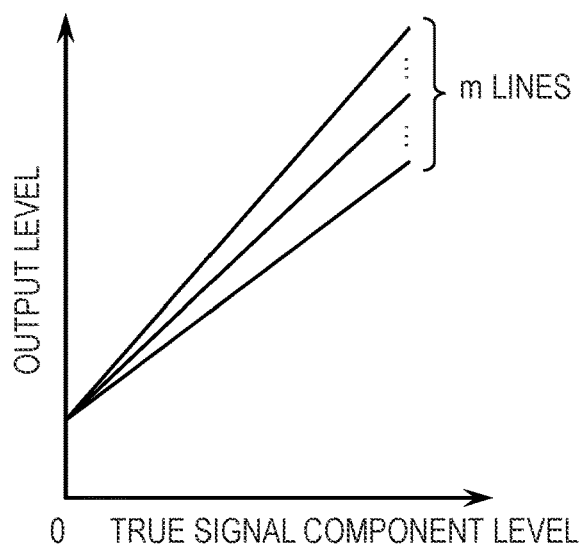
FIG. 6A, FIG. 6B, and FIG. 6C are graphs conceptually illustrating a pixel signal correction method in the imaging device according to the first embodiment of the present invention.
Figure 6B:
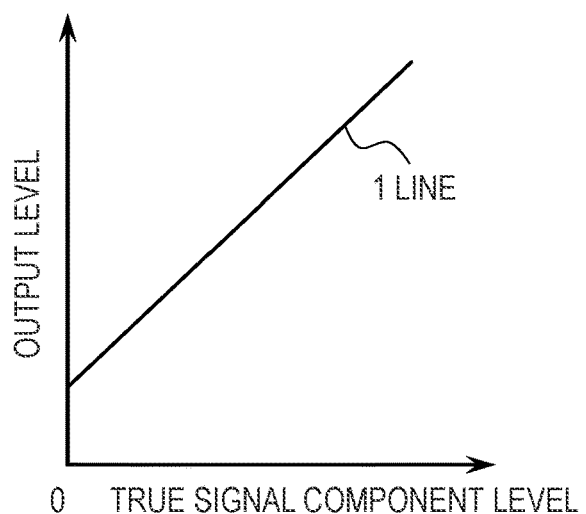

Next, a pixel signal correction method in the imaging device according to the present embodiment will be described with reference to FIG. 5 to FIG. 6C. FIG. 5 is a flowchart illustrating a pixel signal correction method in the imaging device according to the present embodiment. FIG. 6A to FIG. 6C are graphs conceptually illustrating the pixel signal correction method in the imaging device according to the present embodiment.

Here, a description will be given focusing on a signal S1 output from an arbitrary one of the pixels P of m-number of columns×n-number of rows constituting the pixel unit 10. While the signal S1 is an analog signal, the signal output from the column circuit unit 30 is a digital signal obtained by amplifying the analog signal and performing AD conversion, and both are parameters of different scales. In order to facilitate understanding, it is assumed that the signal S1 and the output signal from the column circuit unit 30 are represented on the same scale using a common parameter, i.e., the true signal component S to be acquired.

First, in step S101, a signal S1 is output from a certain pixel P of the pixel unit 10 via the vertical output line 14. On the signal S1, a noise N1 of an offset component due to a dark current in the pixel unit 10 is superimposed on the true signal component S to be acquired. That is, the signal S1 is represented by the following Equation (1).

$$S1 = S + N1 \quad (1)$$

In step S102, the column circuit unit 30 performs an amplification processing and an AD conversion processing on the signal S1. In the column circuit unit 30, a noise N2 of a gain component is generated for each column due to the characteristic variation of the amplifier 32 of each column. In the column circuit unit 30, a noise of an offset component may be generated as in the case of the pixel unit 10, but a description thereof will be omitted here for simplicity. When the signal output from the column circuit unit 30 is represented by S2, the signal S2 is represented by the following Equation (2).

$$S2 = (S + N1) \times N2 \quad (2)$$

In step S103, the first processing unit 52 of the signal processing unit 50 performs a correction processing on the signal S2. The first processing unit 52 performs the correction processing on the signal S2 to reduce the noise N2 of the gain component generated in the column circuit unit 30. Since the noise generated in the column circuit unit 30 varies for each column, the correction may be performed with higher accuracy by performing the correction processing using the correction value determined for each column. Therefore, the first correction value holding unit 54 stores m-number of gain correction values corresponding to the amplifiers 32 of the respective columns in advance. The correction processing in the first processing unit 52 may be performed by multiplying the signal S2 by the correction value (1/N2) of the corresponding column held in the first correction value holding unit 54. Specifically, when the signal after the correction processing in the first processing unit 52 is represented by S3, the signal S3 is represented by the following Equation (3).

$$S3 = (S + N1) \times N2 / N2 = S + N1 \quad (3)$$

In step S104, the second processing unit 56 performs a correction processing on the signal S3. The second processing unit 56 performs the correction processing on the signal S3 to reduce the noise N1 of the offset component due to the dark current generated in the pixel unit 10. In the case where the pixel unit 10 is composed of the pixels P having the same characteristic, by collectively performing the correction for all the pixels P, it is possible to reduce the memory capacity required for holding the correction value while maintaining the correction accuracy. Therefore, the second correction value holding unit 58 stores one correction value in advance. This correction value may be generated, for example, by an average value of the plurality of pixels. Hereinafter, this correction value is denoted as N1ave. The correction processing in the second processing unit 56 may be performed by adding the correction value (-N1ave) held in the second correction value holding unit 58 to the signal S3. Specifically, when the signal after the correction processing in the second processing unit 56 is represented by S4, the signal S4 is represented by the following Equation (4). That is, the true signal component S to be acquired may be obtained as the signal S4. Since the noise N1 is a random noise different for each pixel, it is assumed that (N1-N1ave) similarly becomes a random noise. In general, random noise is said to be difficult to perceive, and the correction processing in step S104 may be said to be effective for obtaining a true signal component S to be acquired.

$$S4 = S + (N1 - N1ave) \quad (4)$$

Assuming that the processing of step S104 is performed on the signal S2 prior to the processing of step S103, the signal S3 is represented by the following Equation (5). In one example, the correction value of the second processing unit 56 when the processing of step S104 is performed first may be (N1ave×N2ave) generated by an average value of a plurality of pixels. At this time, the correction value N2ave is in a state where noises of a plurality of columns are mixed. Since the correction values N1ave and N2ave are generated from the average value of a plurality of pixels, (N1×N2) is equal to (N1ave×N2ave), and the correction residue occurs. When the processing of step S103 is performed on the signal S3, the signal S4 is represented by the following Equation (6). Here, since N2 is fixed pattern noise different for each column, it is assumed that (N1-N1ave×N2ave/N2) similarly becomes fixed pattern noise for each column. In general, it is said that fixed pattern noise for each column is easy to perceive, and it cannot be said that correction is effective for obtaining the true signal component S to be acquired.

$$S3 = (S + N1) \times N2 - N1ave \times N2ave \quad (5)$$

$$S4 = S + (N1 - N1ave \times N2ave / N2) \quad (6)$$

As described above, in the correction method of the present embodiment, first, the first processing unit 52 performs the arithmetic processing including the processing for reducing the gain error component of the column circuit generated in the column circuit and superimposed on the signal S2 on each of the signals S2 output from the column circuit. Then, the second processing unit 56 performs the arithmetic processing for reducing the noise generated in the pixel P and superimposed on the signal S3 on the signal S3 processed by the first processing unit 52. By performing the correction processing on the signal S2 in such the processing procedure, it is possible to acquire the signal S4 in which there is no correction residue or in which the remaining correction is greatly reduced.

Next, the correction method of the present embodiment will be schematically described with reference to FIG. 6A to FIG. 6C. FIG. 6A illustrates the signal S2 processed by the column circuit unit 30. FIG. 6B illustrates the signal S3 processed by the first processing unit 52. FIG. 6C illustrates the signal S4 processed by the second processing unit 56. In each figure, the vertical axis represents the output level of each signal, and the horizontal axis represents the level of the true signal component. The slope of the graph indicates gain, and the intercept of the graph indicates the offset due to noise. For example, when the gain of the amplifier 32 is 1 times and the noises N1 and N2 are not present, the level of the output signal is equal to the level of the true signal component S, so that the graph becomes a straight line with the slope of 1 and the intercept of 0.

As described above, the noise N1 of the offset component generated in the pixel unit 10 and the noise N2 of the gain component generated in the column circuit unit 30 are superimposed on the signal S2 processed in the column circuit unit 30. The intercept of the graph of the signal S2 is raised in the vertical axis direction from the origin by the noise N1 of the offset component generated in the pixel unit 10. For simplicity of explanations, random noise for each pixel is omitted here. The slope of the graph of the signal S2 changes according to the variation of the gain. Since there is a variation in gain in the amplifier 32 of each column, the graph of the signal S2 output from the column circuit of each column does not overlap with one, but is divided into m-number of straight lines corresponding to the number of columns at most (see FIG. 6A).

By performing the correction processing on the signals S2 of the respective columns in the first processing unit 52, the noise N2 of the gain component superimposed on the signals S2 is removed, and the gains of the signals S3 of the respective columns become equal. As a result, the straight lines of the signal S2 separated into m lines at most overlap and become one line, and the straight line of the signal S3 becomes one line (see FIG. 6B).

Figure 6C:
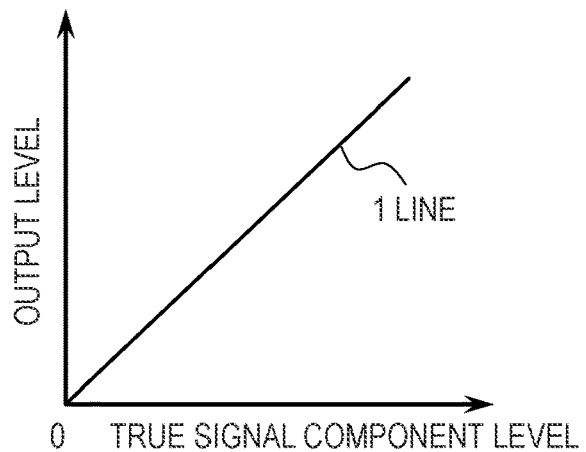

By performing the correction processing on the signal S3 in the second processing unit 56, the noise N1 of the offset component superimposed on the signal S3 is removed, and the intercept of the graph becomes 0 (see FIG. 6C).

In this manner, by removing the noise N2 of the gain component generated in the column circuit unit 30 and then removing the noise N1 of the offset component generated in the pixel unit 10, it is possible to output the image data (the signal S4) with effectively decreasing the noise component from the signal processing unit 50.

In the present embodiment, the correction by multiplication is exemplified as the correction method in the first processing unit 52, but the correction processing in the first processing unit 52 is not limited thereto. That is, the correction processing in the first processing unit 52 may be a processing for reducing the gain error component generated in the column circuit unit 30. For example, the first processing unit 52 may perform correction by division. Alternatively, a correction value table holding correction values may be prepared, and the correction may be performed based on the correction values read out from the correction value table.

Further, in the present embodiment, the noise N2 of the gain component is exemplified as the correction target in the first processing unit 52, but the correction target in the first processing unit 52 is not limited thereto. The correction target in the first processing unit 52 may be a noise that is generated in the column circuit unit 30 and can be processed by a calculation process of multiplying the signal S2. For example, the first processing unit 52 may perform a linearity correction in which a correction is performed so that the light amount of the incident light and the level of the output signal become a linear relationship.

Similarly, although the noise N1 of the offset component is exemplified as the correction target in the second processing unit 56 in the present embodiment, the correction target in the second processing unit 56 is not limited thereto. The correction target in the second processing unit 56 may be a noise generated in the pixel unit 10. For example, the second processing unit 56 may perform an arithmetic processing for reducing the noise of the gain component or the linearity correction. Even in these cases, as described in the present embodiment, it is possible to reduce the correction residue and prevent degradation of image quality.

Further, in the present embodiment, although the correction of the signal S2 in the first processing unit 52 is performed for each column using the correction value corresponding to the column circuit of each column is exemplified here, it may be performed for each group using a correction value set for each group including a predetermined number of columns. For example, m-number of columns may be divided into a plurality of groups each including five columns, and the correction may be performed using a common correction value for columns belonging to the same group. In this case, the first correction value holding unit 54 only needs to hold (m/5) correction values, and the memory capacity necessary for holding the correction values may be reduced. However, since the noise generated in the column circuit unit 30 has variation for each column, when higher precision correction is required, it is preferable to reduce the number of columns included in one group, for example, by using a correction value for each column as in the present embodiment.

Further, in the present embodiment, an example is described in which the first processing unit 52 performs correction for reducing the noise for each column, but the first processing unit 52 may perform correction for reducing the noise for each row. Also in this case, as described in the present embodiment, it is possible to reduce the correction residue and prevent degradation of image quality.

As described above, according to the present embodiment, it is possible to appropriately correct noise caused by the pixel circuit and the readout circuit and suppress deterioration of image quality.

Second Embodiment

Figure 7:
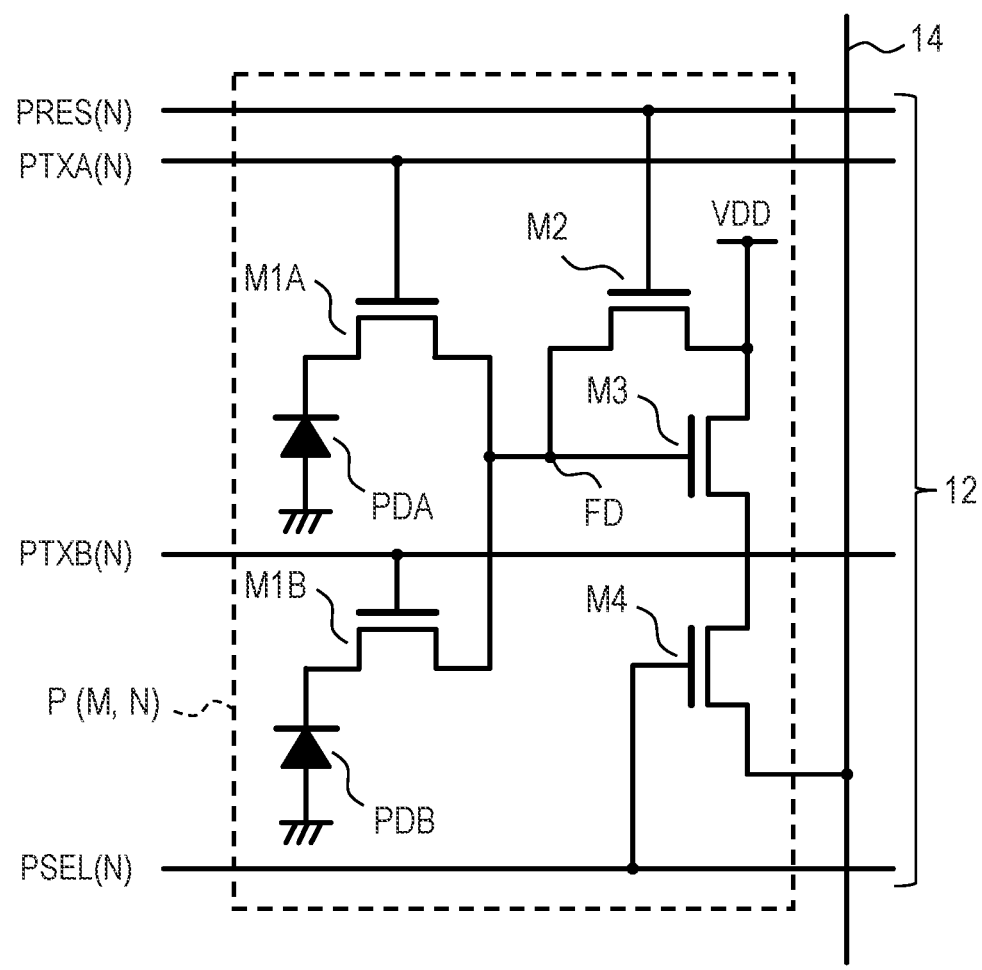
FIG. 7 is a circuit diagram illustrating a configuration example of a pixel in an imaging device according to a second embodiment of the present invention.
Figure 8:
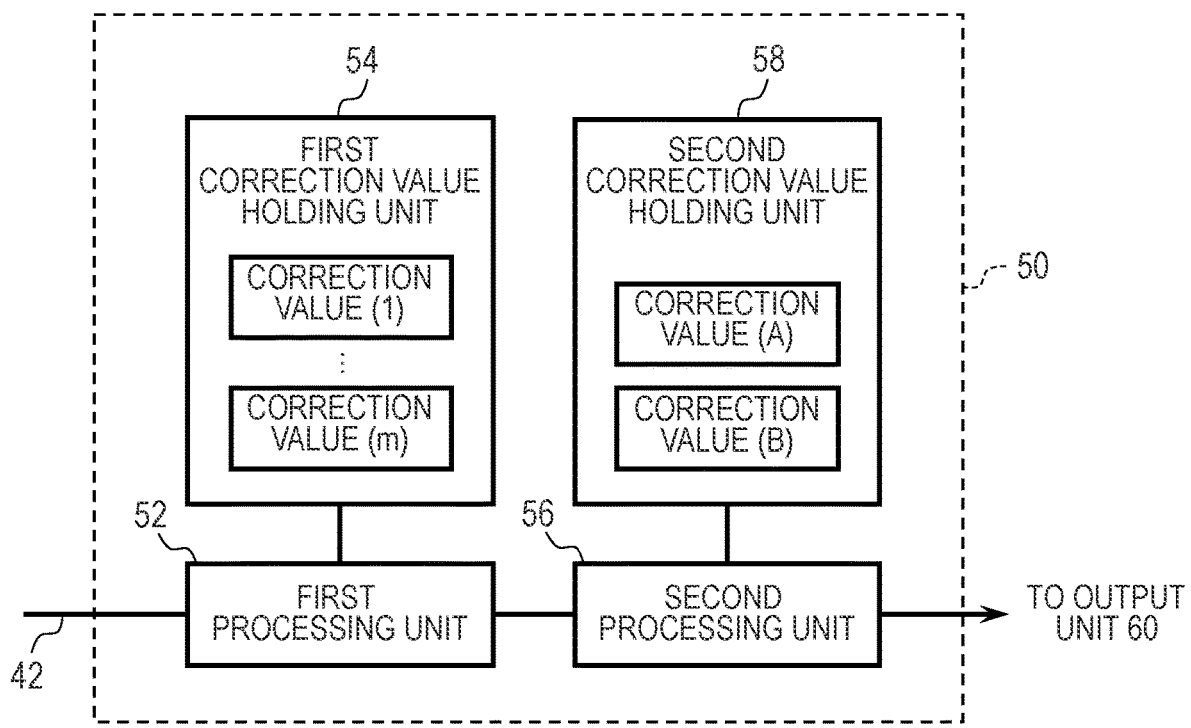
FIG. 8 is a block diagram illustrating a schematic configuration of a signal processing unit in the imaging device according to the second embodiment of the present invention.

An imaging device according to a second embodiment of the present invention will be described with reference to FIG. 7 and FIG. 8. FIG. 7 is a circuit diagram illustrating a configuration example of a pixel in the imaging device according to the present embodiment. FIG. 8 is a block diagram illustrating a configuration example of a signal processing unit in the imaging device according to the present embodiment. Components similar to those of the imaging device according to the first embodiment are denoted by the same reference numerals, and description thereof will be omitted or simplified.

The imaging device according to the present embodiment is different from the imaging device according to the first embodiment in the configuration of at least a part of the pixels P among the plurality of pixels P constituting the pixel unit 10. That is, the pixel P (M, N) of the imaging device according to the present embodiment, for example, as illustrated in FIG. 7, may include photoelectric conversion elements PDA and PDB, transfer transistors M1A and M1B, a reset transistor M2, an amplifier transistor M3, and a select transistor M4. The photoelectric conversion elements PDA and PDB of one pixel P are arranged so as to share one microlens, and light passing through different pupil regions of the incident optical system is incident on the photoelectric conversion elements PDA and PDB. It can also be said that the pixel P includes a sub-pixel A including the photoelectric conversion element PDA and a sub-pixel B including the photoelectric conversion element PDB.

The photoelectric conversion elements PDA and PDB are, for example, photodiodes. The photoelectric conversion element PDA has an anode connected to a reference voltage node and a cathode connected to a source of the transfer transistor M1A. The photoelectric conversion element PDB has an anode connected to the reference voltage node and a cathode connected to a source of the transfer transistor M1B. A drain of the transfer transistor M1A and a drain of the transfer transistor M1B are connected to a source of the reset transistor M2 and a gate of the amplifier transistor M3. A node FD to which the drain of the transfer transistor M1A, the drain of the transfer transistor M1B, the source of the reset transistor M2, and the gate of the amplifier transistor M3 are connected is a floating diffusion. A drain of the reset transistor M2 and a drain of the amplifier transistor M3 are connected to a node to which a power supply voltage (voltage VDD) is supplied. A source of the amplifier transistor M3 is connected to a drain of the select transistor M4. A source of the select transistor M4 is connected to the vertical output line 14.

In the circuit configuration of FIG. 7, the control line 12 of each row includes four signal lines including a signal line connected to the gate of the transfer transistor M1A, a signal line connected to the gate of the transfer transistor M1B, a signal line connected to the gate of the reset transistor M2, and a signal line connected to the gate of the select transistor M4. A control signal PTXA (N) is supplied from the vertical scanning circuit unit 20 to the gate of the transfer transistor M1A of the pixel P of the N-th row. A control signal PTXB (N) is supplied from the vertical scanning circuit unit 20 to the gate of the transfer transistor M1B of the pixel P of the N-th row. A control signal PRES (N) is supplied from the vertical scanning circuit unit 20 to the gate of the reset transistor M2 of the pixel P of the N-th row. A control signal PSEL (N) is supplied from the vertical scanning circuit unit 20 to the gates of the select transistors M4 of the pixels P in the N-th row. When each transistor is formed of an n-channel MOS transistor, when a high-level control signal is supplied from the vertical scanning circuit unit 20, the corresponding transistor is turned on. When a low-level control signal is supplied from the vertical scanning circuit unit 20, the corresponding transistor is turned off.

The photoelectric conversion elements PDA and PDB convert (photoelectrically convert) incident light into charge of an amount corresponding to an amount of the incident light, and accumulate the generated charge. The transfer transistor M1A transfers the charge held in the photoelectric conversion element PDA to the node FD by turning on. The transfer transistor M1B transfers the charge held in the photoelectric conversion element PDB to the node FD by turning on. The charge transferred from the photoelectric conversion elements PDA and PDB are held in the capacitance (floating diffusion capacitance) of the node FD. As a result, the node FD becomes a potential corresponding to the amount of charge transferred from the photoelectric conversion element PDA and/or the photoelectric conversion element PDB by the charge-voltage conversion by the floating diffusion capacitance.

The select transistor M4 connects the amplifier transistor M3 to the vertical output line 14 by turning on. The amplifier transistor M3 is configured such that a voltage VDD is supplied to the drain and a bias current is supplied from a current source (not illustrated) to the source via the select transistor M4, and constitutes an amplifier unit (source follower circuit) having the gate as an input node. Accordingly, the amplifier transistor M3 outputs a signal based on the voltage of the node FD to the vertical output line 14 via the select transistor M4.

The reset transistor M2 has a function of controlling supply of a voltage (voltage VDD) for resetting the node FD serving as a charge holding portion to the FD node. The reset transistor M2 resets the node FD to a voltage corresponding to the voltage VDD by turning on. At this time, by simultaneously turning on the transfer transistor M1A, the photoelectric conversion element PDA may be reset to a voltage corresponding to the voltage VDD. Further, by simultaneously turning on the transfer transistor M1B, the photoelectric conversion element PDB may be reset to a voltage corresponding to the voltage VDD.

By appropriately controlling the transfer transistors M1A and M1B, the reset transistor M2, and the select transistor M4, a noise signal (N-signal) and a signal (S-signal) corresponding to an amount of incident light to the photoelectric conversion elements PDA and PDB may be read out from each pixel P.

In the pixel P of the present embodiment, the two photoelectric conversion elements PDA and PDB share one floating diffusion (node FD). A signal based on the charge generated by the photoelectric conversion element PDA and a signal based on the charge generated by the photoelectric conversion element PDB may be read out from the pixel P separately or in combination. For example, first, the N-signal and the S-signal (A-signal) based on the charge generated in the photoelectric conversion element PDA are read out, and then the N-signal and the S-signal (B-signal) based on the charge generated in the photoelectric conversion element PDB are read out. The A-signal and the B-signal may be used as signals for focus detection. The (A+B)-signal obtained by adding the A-signal and the B-signal may be used as a signal for image generation.

The imaging device according to the present embodiment differs from the imaging device according to the first embodiment in the configuration of the signal processing unit 50 corresponding to the difference in the configuration of the pixels P. That is, in the signal processing unit 50 of the imaging device according to the present embodiment, for example, as illustrated in FIG. 8, at least two correction values are previously held in the second correction value holding unit 58. The other points of the signal processing unit 50 are the same as those of the signal processing unit 50 of the first embodiment.

In the present embodiment, the A-signals and the B-signals output from the pixels P in an arbitrary column are input to one column circuit among a plurality of column circuits constituting the column circuit unit 30. Therefore, the noise N2 of the same gain component is superimposed on the A-signals and the B-signals in the column circuit unit 30. Therefore, as in the case of the first embodiment, the first processing unit 52 of the signal processing unit 50 performs correction for reducing the noise N2 of the gain component by using the m-number of correction values corresponding to the column circuits of each column. From such a viewpoint, the first correction value holding unit 54 holds m-number of correction values corresponding to each column of the pixel unit 10 in advance.

On the other hand, the A-signal is a signal based on the charge generated in the photoelectric conversion element PDA, whereas the B-signal is a signal based on the charge generated in the photoelectric conversion element PDB. Therefore, noises N1 of offset components different from each other may be superimposed on the A-signal and the B-signal. Therefore, unlike the case of the first embodiment, the second processing unit 56 of the signal processing unit 50 according to the present embodiment uses the correction value corresponding to the sub-pixel A and the correction value corresponding to the sub-pixel B, and performs correction for reducing the noises N1 of the offset component superimposed on the A-signal and the B-signal. From such a viewpoint, the second correction value holding unit 58 holds in advance correction values of the number corresponding to the number of sub-pixels included in one pixel P.

The order in which the signal processing unit 50 of the present embodiment performs the correction processing is the same as in the first embodiment. That is, after performing the correction processing for reducing the noise N2 of the gain component in the first processing unit 52, the second processing unit 56 performs the correction processing for reducing the noise N1 of the offset component.

In this way, by performing the correction processing for reducing the noise N1 of the offset component in units of sub-pixels, even when the pixel P is composed of a plurality of sub-pixels that may generate different noises, it is possible to reduce the correction residue and to prevent degradation of image quality.

Although the second correction value holding unit 58 holds two correction values corresponding to the sub-pixel A and the sub-pixel B in the present embodiment, the second correction value holding unit 58 may have only a correction value corresponding to the (A+B)-signal. With this configuration, it is possible to reduce the memory capacity required for holding the correction value. In this case, the second correction value holding unit 58 only needs to hold one correction value, as in the case of the first embodiment.

As described above, according to the present embodiment, it is possible to appropriately correct noise caused by the pixel circuit and the readout circuit and suppress deterioration of image quality.

Third Embodiment

Figure 9:
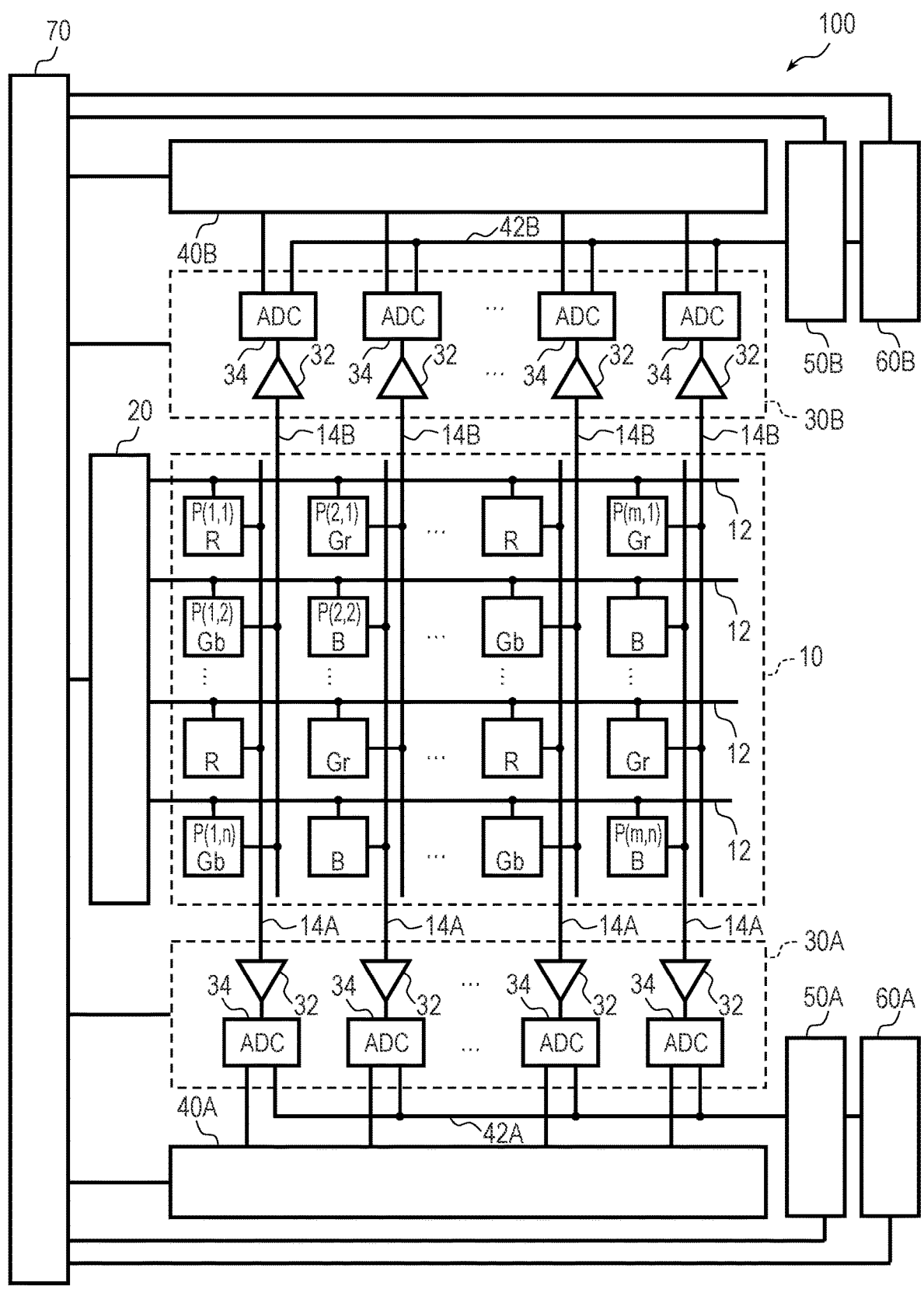
FIG. 9 is a block diagram illustrating a schematic configuration of an imaging device according to a third embodiment of the present invention.
Figure 10:
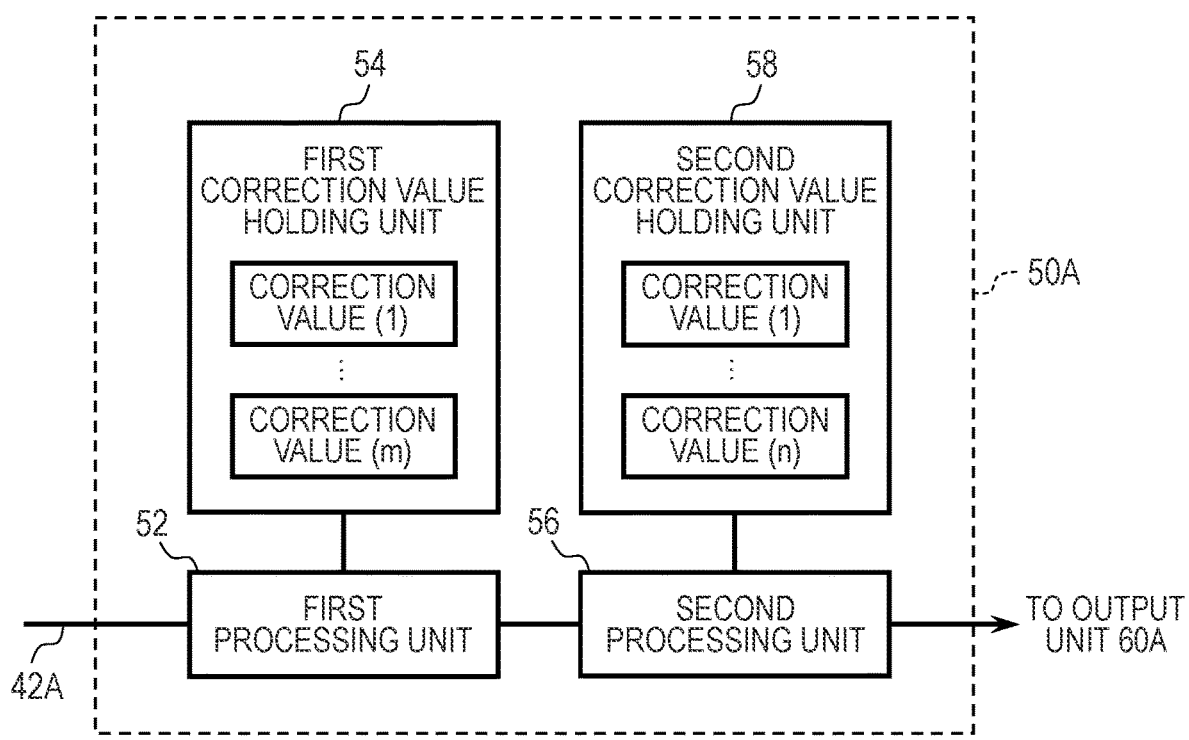
FIG. 10 is a block diagram illustrating a schematic configuration of a signal processing unit in the imaging device according to the third embodiment of the present invention.

An imaging device according to a third embodiment of the present invention will be described with reference to FIG. 9 and FIG. 10. FIG. 9 is a block diagram illustrating a schematic configuration of the imaging device according to the present embodiment. FIG. 10 is a block diagram illustrating a configuration example of a signal processing unit in the imaging device according to the present embodiment. The same components as those of the imaging device according to the first or second embodiment are denoted by the same reference numerals, and description thereof will be omitted or simplified.

As illustrated in FIG. 9, the imaging device 100 according to the present embodiment includes a pixel unit 10, a vertical scanning circuit unit 20, column circuit units 30A and 30B, horizontal scanning circuit units 40A and 40B, signal processing units 50A and 50B, output units 60A and 60B, and a control unit 70. The column circuit unit 30A, the horizontal scanning circuit unit 40A, the signal processing unit 50A, and the output unit 60A constitute a set of a readout circuit unit. The column circuit unit 30B, the horizontal scanning circuit unit 40B, the signal processing unit 50B, and the output unit 60B constitute another set of a readout circuit unit. The pixel unit 10 is disposed between the two readout circuit units.

As in the first embodiment, a plurality of pixels P arranged in a matrix of m-number of columns×n-number of rows are arranged in the pixel unit 10. Each pixel P disposed in the pixel unit 10 includes a color filter having a predetermined spectral sensitivity characteristic. FIG. 9 illustrates an example in which a plurality of pixels P are arranged in accordance with a Bayer arrangement which is one of arrangements of color patterns of the color filters. In the Bayer array, pixels provided with a green color filter (G (Green) pixels), pixels provided with a red color filter (R (Red) pixels), and pixels provided with a blue color filter (B (Blue) pixels) are arranged at a ratio of 2:1:1. Here, the R pixel is a pixel having sensitivity to light in a red wavelength band, the G pixel is a pixel having sensitivity to light in a green wavelength band, and the B pixel is a pixel having sensitivity to light in a blue wavelength band. That is, the R pixel, the G pixel, and the B pixel have mutually different optical characteristics.

In the Bayer array, rows in which R pixels and G pixels are alternately arranged and rows in which G pixels and B pixels are alternately arranged are alternately arranged. Here, for convenience, G pixels arranged in the same row as the R pixels are denoted by Gr pixels, and G pixels arranged in the same row as the B pixels are denoted by Gb pixels. That is, as illustrated in FIG. 9, the pixel unit 10 includes a row in which R pixels, Gr pixels, . . . are arranged, and a row in which Gb pixels, B pixels, . . . are arranged.

In each row of the pixel unit 10, a control line 12 are arranged extending in the row direction. Each of the control lines 12 is connected to each of the pixels P arranged in the row direction, and forms a common signal line for these pixels P. Each of the control lines 12 may include a plurality of signal lines. The control lines 12 are connected to the vertical scanning circuit unit 20. The vertical scanning circuit unit 20 is the same as the vertical scanning circuit unit 20 of the first embodiment.

In each column of the pixel unit 10, a vertical output line 14A and a vertical output line 14B are arranged so as to extend in the column direction. The plurality of pixels P constituting the pixel unit 10 are divided into the pixels P connected to the vertical output line 14A and the pixels P connected to the vertical output line 14B. In the configuration example illustrated in FIG. 9, the pixels P connected to the vertical output lines 14A and the pixels P connected to the vertical output lines 14B are alternately arranged in each row and each column of the pixel array constituting the pixel unit 10.

Specifically, each of the vertical output lines 14A is connected to the R pixels or the B pixels among the pixels P arranged in the column direction, and forms a common signal line for these pixels P. Each of the vertical output lines 14B is connected to the Gr pixels or the Gb pixels among the pixels P arranged in the column direction, and forms a common signal line for these pixels P. The vertical output lines 14A are connected to the column circuit unit 30A. The vertical output lines 14B are connected to the column circuit unit 30B.

Similar to the column circuit unit 30 of the first embodiment, the column circuit units 30A and 30B have a plurality of column circuits provided corresponding to each column of the pixel unit 10. Each of the plurality of column circuits includes an amplifier 32 and an ADC (AD conversion circuit) 34. The amplifier 32 amplifies the pixel signal output from the pixel unit 10 via the vertical output line 14A or 14B of the corresponding column with a predetermined gain and outputs the amplified pixel signal. The ADC 34 converts the pixel signal output from the amplifier 32 of the corresponding column from an analog signal to a digital signal. The ADC 34 has a memory unit, and holds the pixel signal (image data) converted into the digital signal in the memory unit.

The horizontal scanning circuit unit 40A is a control circuit having a function of receiving a control signal supplied from the control unit 70, generating a signal for reading out a pixel signal held by the column circuit unit 30A, and supplying the generated signal to the ADC 34 of each column. A control line of the horizontal scanning circuit unit 40A provided corresponding to each column of the pixel unit 10 is connected to the ADC 34 of the corresponding column. The horizontal scanning circuit unit 40A sequentially scans the ADC 34 of each column of the column circuit unit 30A, and outputs the image data held in each column to the signal processing unit 50A via the horizontal output line 42A.

Similarly, the horizontal scanning circuit unit 40B is a control circuit having a function of receiving a control signal supplied from the control unit 70, generating a signal for reading out a pixel signal held by the column circuit unit 30B, and supplying the generated signal to the ADC 34 of each column. A control line of the horizontal scanning circuit unit 40B provided corresponding to each column of the pixel unit 10 is connected to the ADC 34 of the corresponding column. The horizontal scanning circuit unit 40B sequentially scans the ADC 34 of each column of the column circuit unit 30B, and outputs the image data held in each column to the signal processing unit 50B via the horizontal output line 42B.

The signal processing unit 50A has a function of performing predetermined signal processing on the pixel signals transferred from the column circuit unit 30A. The signal processing unit 50A has at least a function of performing a correction for reducing a noise of an offset component generated in the pixel unit 10 and a function of performing a correction for reducing a noise of a gain component generated in the column circuit unit 30A. Examples of other processing that may be included in the signal processing unit 50A include various kinds of arithmetic processing, amplification processing, and correction processing using CDS.

Similarly, the signal processing unit 50B has a function of performing predetermined signal processing on the image data transferred from the column circuit unit 30B. The signal processing unit 50B has at least a function of performing a correction for reducing a noise of an offset component generated in the pixel unit 10 and a function of performing a correction for reducing a noise of a gain component generated in the column circuit unit 30B. Examples of other processing that may be included in the signal processing unit 50B include various kinds of arithmetic processing, amplification processing, and correction processing using CDS.

The output unit 60A includes an external interface circuit and outputs the image data processed by the signal processing unit 50A to the outside of the imaging device 100. The output unit 60B includes an external interface circuit and outputs the image data processed by the signal processing unit 50B to the outside of the imaging device 100.

The control unit 70 is a control circuit that generates control signals for controlling operations of the vertical scanning circuit unit 20, the column circuit units 30A and 30B, the horizontal scanning circuit units 40A and 40B, the signal processing units 50A and 50B, and the output units 60A and 60B, and supplies the control signals to the respective functional blocks.

Next, a configuration example of the signal processing unit 50A in the imaging device according to the present embodiment will be described with reference to FIG. 10. Since the configuration of the signal processing unit 50B is similar to that of the signal processing unit 50A, a description thereof is omitted here.

As illustrated in FIG. 10, the signal processing unit 50A includes a first processing unit 52, a first correction value holding unit 54, a second processing unit 56, and a second correction value holding unit 58. The first processing unit 52 is connected to the horizontal output line 42A, the first correction value holding unit 54, and the second processing unit 56. The second processing unit 56 is connected to the second correction value holding unit 58 and the output unit 60A. The first correction value holding unit 54 and the second correction value holding unit 58 are not necessarily provided inside the imaging device 100, and may be provided outside the imaging device 100.

The first processing unit 52 performs arithmetic processing for reducing the noise of the gain component generated in the column circuit unit 30A on the pixel signal received via the horizontal output line 42A by using the correction value held in the first correction value holding unit 54. The second processing unit 56 performs arithmetic processing for reducing the noise of the offset component generated in the pixel unit 10 on the pixel signal processed by the first processing unit 52, using the correction value held in the second correction value holding unit 58. The pixel signals processed by the second processing unit 56 are output to the outside of the imaging device 100 via the output unit 60A.

The first correction value holding unit 54 and the second correction value holding unit 58 may be configured by a volatile storage medium such as a flip-flop or an SRAM. The first correction value holding unit 54 holds m-number of correction values in advance. The second correction value holding unit 58 holds n-number of correction values in advance. These correction values may be generated inside the imaging device 100 and written in the first correction value holding unit 54 and the second correction value holding unit 58, or may be generated outside the imaging device 100 and written in the first correction value holding unit 54 and the second correction value holding unit 58. Generation of the correction values outside the imaging device 100 has an advantage that an appropriate correction value may be generated without being limited by the circuit area.

In the Bayer array, pixel blocks of 2 columns×2 rows form a unit pixel block which is a minimum repeating unit. In the present embodiment, the pixel signals of the four pixels P constituting one unit pixel block are input to the signal processing units 50A and 50B via different column circuits. For example, in FIG. 9, the pixel P (1, 1), the pixel P (1, 2), the pixel P (2, 1), and the pixel P (2, 2) constitute one unit pixel block. The pixel signal of the pixel P (1, 1) is input to the column circuit unit 30A via the vertical output line 14A of the first column, and processed by the column circuit of the first column of the column circuit unit 30A. The pixel signal of the pixel P (1, 2) is input to the column circuit unit 30B via the vertical output line 14B of the first column, and processed by the column circuit of the first column of the column circuit unit 30B. The pixel signal of the pixel P (2, 1) is input to the column circuit unit 30B via the vertical output line 14B of the second column, and processed by the column circuit of the second column of the column circuit unit 30B. The pixel signal of the pixel P (2, 2) is input to the column circuit unit 30A via the vertical output line 14A of the second column, and processed by the column circuit of the second column of the column circuit unit 30A.

That is, the pixel signals of the four pixels P constituting one unit pixel block are processed in different column circuits. Stated another way, the pixel signals of pixels P with color filters of different colors are processed in different column circuits. Therefore, in the present embodiment, as the correction value held in the second correction value holding unit 58, correction values are prepared for each pixel P having color filters of different colors.

For example, the second correction value holding unit 58 of the signal processing unit 50A holds (n/2)-number of correction values corresponding to the odd-numbered rows in which the R pixels are arranged and (n/2)-number of correction values corresponding to the even-numbered rows in which the B pixels are arranged. The second correction value holding unit 58 of the signal processing unit 50B holds (n/2)-number of correction values corresponding to the odd-numbered rows in which the Gr pixels are arranged and (n/2)-number of correction values corresponding to the even-numbered rows in which the Gb pixels are arranged. By preparing such a correction value as a correction value held in the second correction value holding unit 58, even when different noise occurs for each color of the color filter included in the pixel P, the correction may be performed using a correction value suitable for each pixel P. As a result, in comparison with the case where correction is performed using a common correction value, it is possible to reduce the correction residue and prevent degradation of image quality.

The correction values held in the first correction value holding unit 54 of the signal processing units 50A and 50B are the same as those in the first embodiment. That is, the first correction value holding unit 54 of the signal processing unit 50A holds m-number of correction values corresponding to each of the m-number of column circuits of the column circuit unit 30A. The first correction value holding unit 54 of the signal processing unit 50B holds m-number of correction values corresponding to each of the m-number of column circuits of the column circuit unit 30B. This makes it possible to appropriately correct noise caused by variations in characteristics of the column circuits.

In the present embodiment, two sets of readout circuits each including the column circuit unit 30, the signal processing unit 50, and the output unit 60 are disposed so as to sandwich the pixel unit 10 therebetween in consideration of easiness of wiring routing, and the like. However, the arrangement of the readout circuits is not particularly limited as long as the arrangement may process the correction for reducing the noise generated in the column circuit unit 30 and the correction for reducing the noise generated in the pixel unit 10 in this order. For example, two sets of readout circuits each including the column circuit unit 30, the signal processing unit 50, and the output unit 60 may be disposed on one side of the pixel unit 10. Further, the signal processing unit 50 and the output unit 60 are not necessarily divided into two, and one signal processing unit and one output unit 60 may be shared by two read circuits.

Although the vertical output lines 14A and 14B and the column circuits of the column circuit units 30A and 30B correspond to each other in one-to-one correspondence in the present embodiment, the vertical output lines 14 and the column circuits do not necessarily correspond to each other in one-to-one correspondence. For example, any one of the plurality of vertical output lines 14 may be configured to be connectable to one column circuit. In such a case, by holding the correction values corresponding to the number of combinations of the vertical output lines 14 and the column circuits in the first correction value holding unit 54, the correction residue may be reduced as compared with the case where correction is performed using a common correction value.

Although the second processing unit 56 performs the correction processing for each pixel P having color filters of different colors in the present embodiment, the correction processing may be performed in other units. For example, in addition to the color of the color filter included in the pixel P, the second processing unit 56 may perform correction processing for each vertical output line 14, each of a plurality of columns, or each pixel. Also in these cases, the same effect as in the present embodiment may be obtained.

As described above, according to the present embodiment, it is possible to appropriately correct noise caused by the pixel circuit and the readout circuit and suppress deterioration of image quality.

Fourth Embodiment

Figure 11:
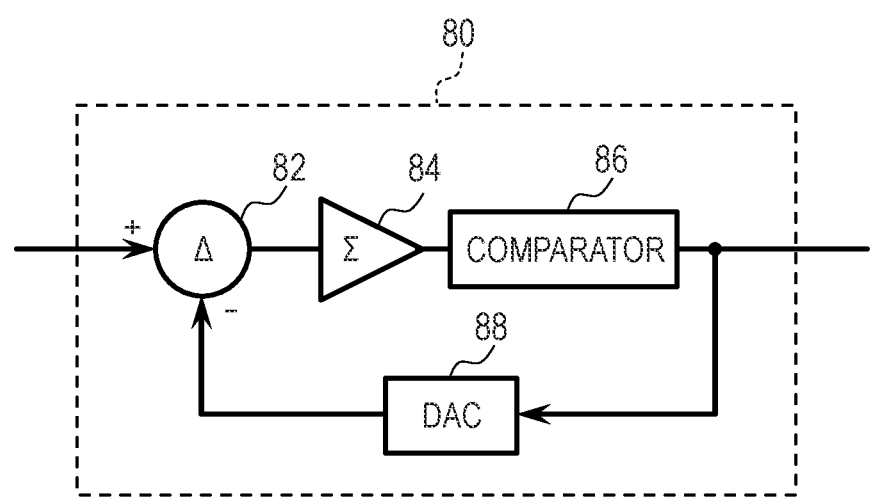
FIG. 11 is a block diagram illustrating a configuration example of a delta-sigma ADC circuit.
Figure 12:
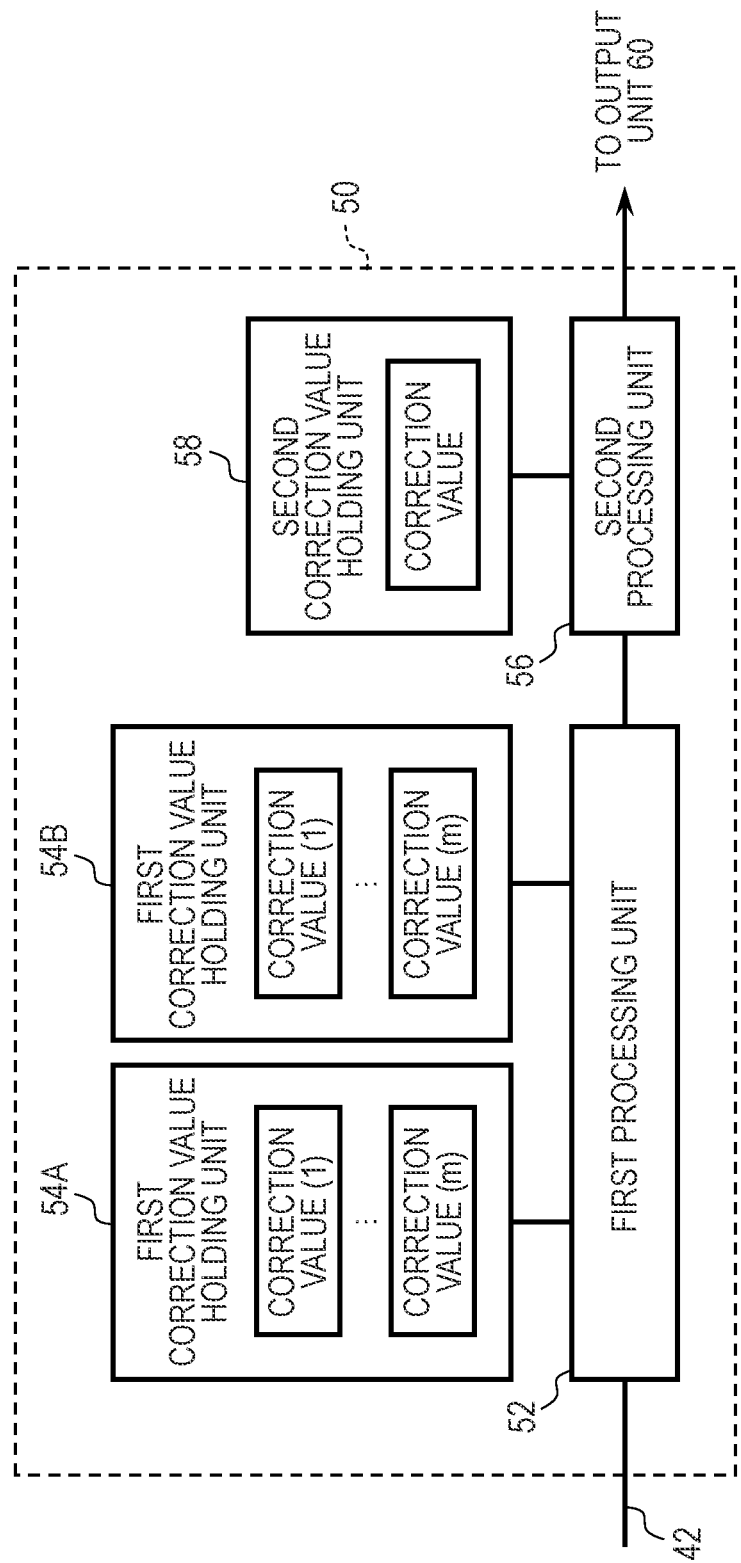
FIG. 12 is a block diagram illustrating a schematic configuration of a signal processing unit in an imaging device according to a fourth embodiment of the present invention.

An imaging device according to a fourth embodiment of the present invention will be described with reference to FIG. 11 and FIG. 12. FIG. 11 is a block diagram illustrating a configuration example of a delta-sigma ADC circuit. FIG. 12 is a block diagram illustrating a configuration example of a signal processing unit in the imaging device according to the present embodiment. Components similar to those of the imaging device according to the first to third embodiments are denoted by the same reference numerals, and description thereof will be omitted or simplified.

In the present embodiment, an example in which two kinds of noise generated in the column circuit unit 30 are corrected in the first processing unit 52 is described. As an example of such a configuration, the ADC 34 of the column circuit unit 30 includes a delta-sigma ADC circuit.

The delta-sigma ADC circuit is an AD conversion circuit capable of obtaining high resolution by increasing the number of samples. For example, as illustrated in FIG. 11, a delta-sigma ADC circuit 80 may include a subtraction circuit ($\Delta$) 82, an integration circuit ($\Sigma$) 84, a comparator 86, and DAC (Digital Analog Converter) 88. An input node of the subtraction circuit 82, which is also an input node of the delta-sigma ADC circuit 80, is connected to an output node of the amplifier 32 and an output node of the DAC 88. An output node of the subtraction circuit 82 is connected to an input node of the integration circuit 84. An output node of the integration circuit 84 is connected to an input node of the comparator 86. An output node of the comparator 86 is connected to an input node of the DAC 88, and constitutes an output node of the delta-sigma ADC circuit 80.

The subtraction circuit 82 outputs a difference between the input pixel signal and a fixed value. The integration circuit 84 integrates the subtraction value output from the subtraction circuit 82. The comparator 86 compares the integration result output from the integration circuit 84 with a certain value, and outputs a comparison result. The DAC 88 converts the signal output from the comparator 86 into an analog signal. Thus, the delta-sigma ADC circuit 80 is characterized by performing two-stage conversion in the subtraction circuit 82 and the integration circuit 84. In such a case, a noise of an offset component may occur in the conversion processing by the subtraction circuit 82, and a noise multiplied by the pixel signal may occur in the conversion by the integration circuit 84.

Therefore, in the signal processing unit 50 of the present embodiment, two first correction value holding units 54A and 54B for holding two types of correction values are provided as correction value holding units referred to by the first processing unit 52 in order to perform correction for reducing these noises generated in the ADC 34. Then, the first correction value holding unit 54A holds m-number of correction values corresponding to each of the m-number of column circuits of the column circuit unit 30 as correction values for performing correction to reduce the noise of the offset component. The first correction value holding unit 54B holds m-number of correction values corresponding to each of the m-number of column circuits of the column circuit unit 30 as correction values for performing correction to reduce noise multiplied by the pixel signal.

Then, the first processing unit 52 performs a correction using the correction value held in the first correction value holding unit 54A and a correction using the correction value held in the first correction value holding unit 54B for each of the m-number of signals processed by the column circuit of each column of the column circuit unit 30. As in the case of the first embodiment, the second processing unit 56 corrects each of the m-number of signals processed by the first processing unit 52 using the common correction value held in the second correction value holding unit 58.

In this manner, before performing the correction for reducing the noise generated in the pixel unit 10, the correction for reducing the two kinds of noise generated in the column circuits of each column of the column circuit unit 30 is performed, whereby the correction residue may be reduced and the degradation of the image quality may be prevented.

In the present embodiment, the correction method when two kinds of noise occur in the column circuit unit 30 is described, but two kinds of noise may occur in the pixel unit 10. In such a case, similarly to the first correction value holding units 54A and 54B of the present embodiment, two second correction value holding units may be prepared as the correction value holding units referred to by the second processing unit 56. By performing correction to reduce the noise generated in the column circuits of the respective columns of the column circuit unit 30, and then performing correction to reduce the two kinds of noise generated in the pixel unit 10, the same effect as in the present embodiment may be obtained.

As described above, according to the present embodiment, it is possible to appropriately correct noise caused by the pixel circuit and the readout circuit and suppress deterioration of image quality.

Fifth Embodiment

Figure 13:
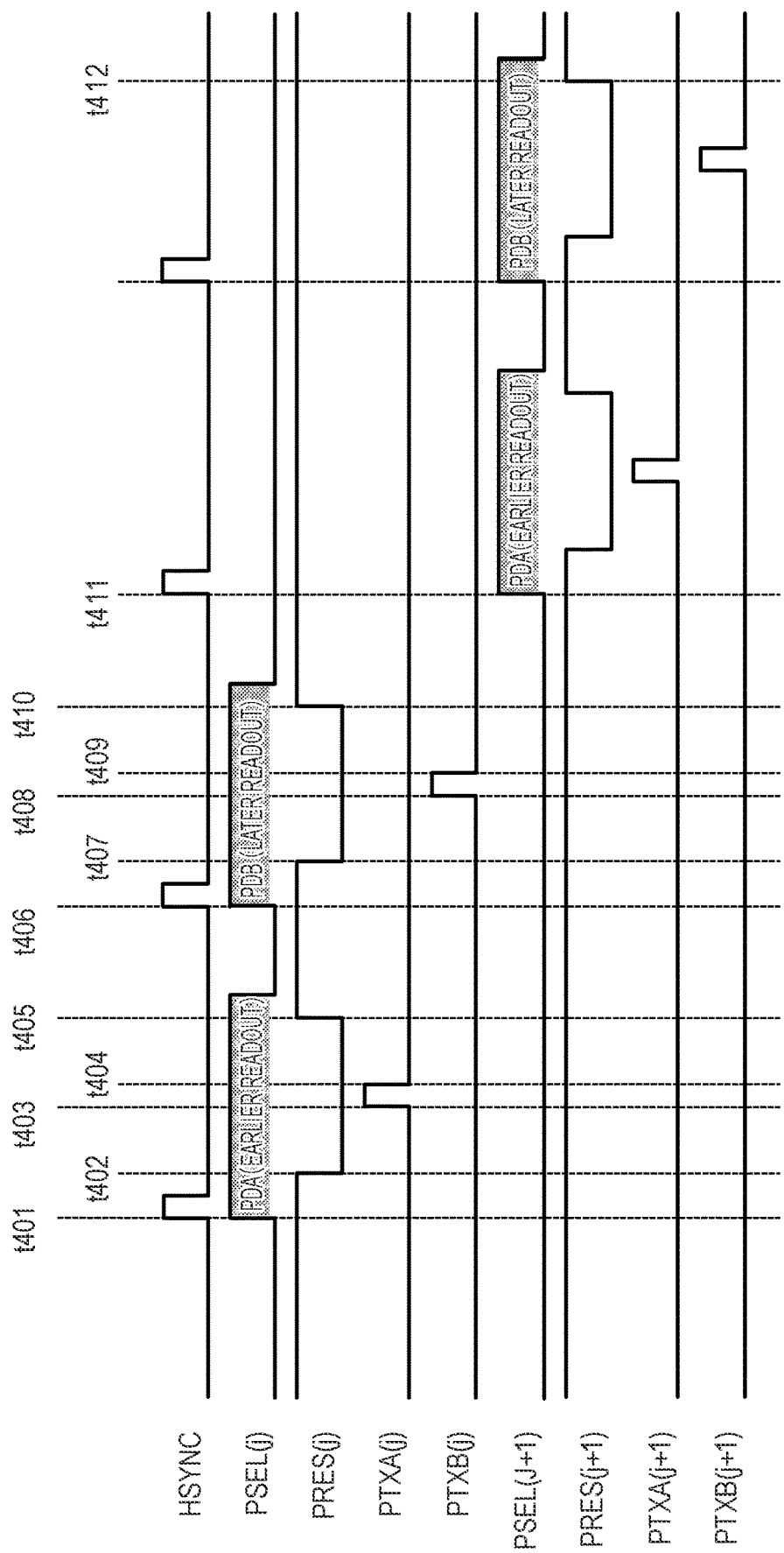
FIG. 13 is a timing chart illustrating a signal readout operation in an imaging device according to a fifth embodiment of the present invention.
Figure 14:
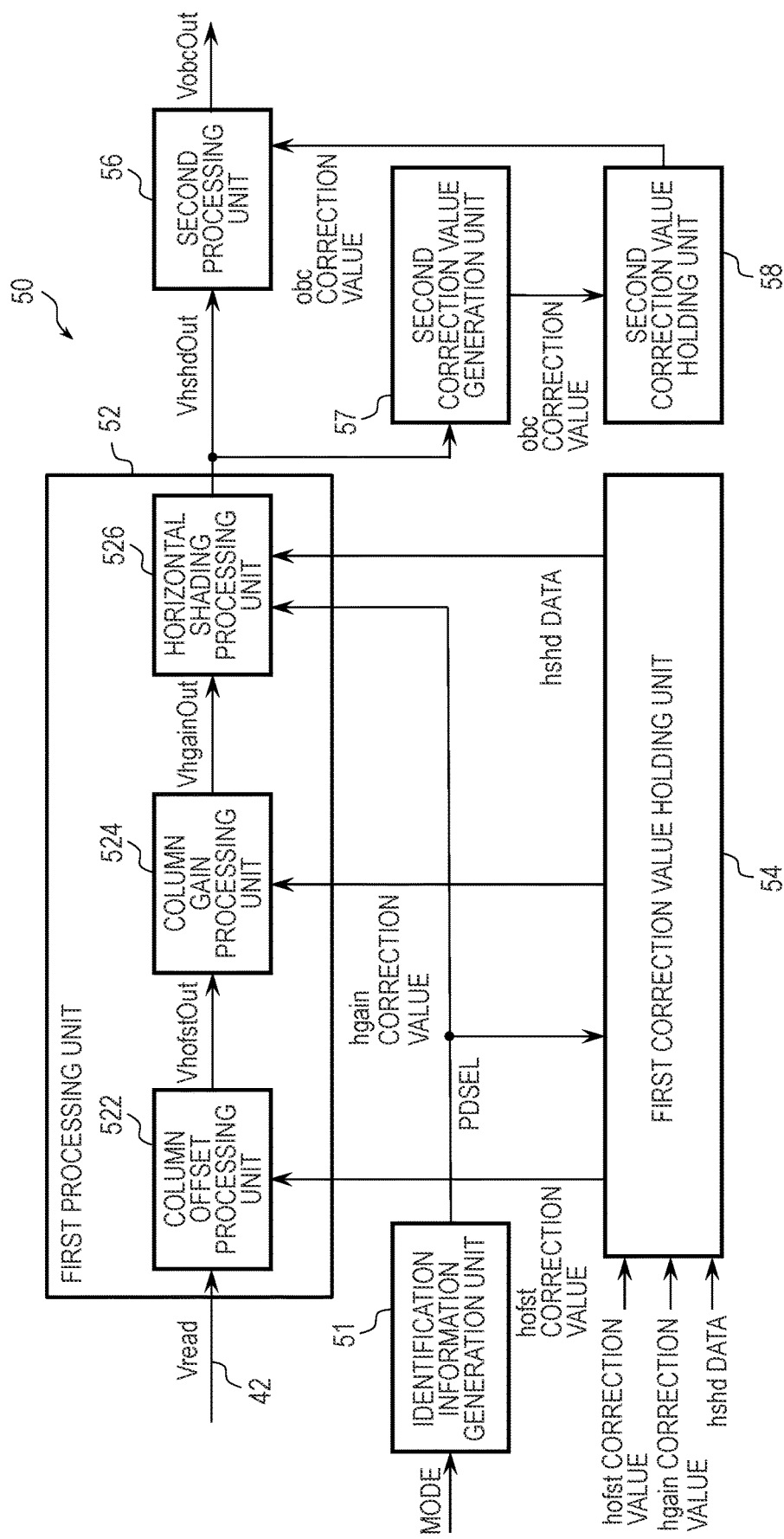
FIG. 14 is a block diagram illustrating a schematic configuration of a signal processing unit in the imaging device according to the fifth embodiment of the present invention.
Figure 15:
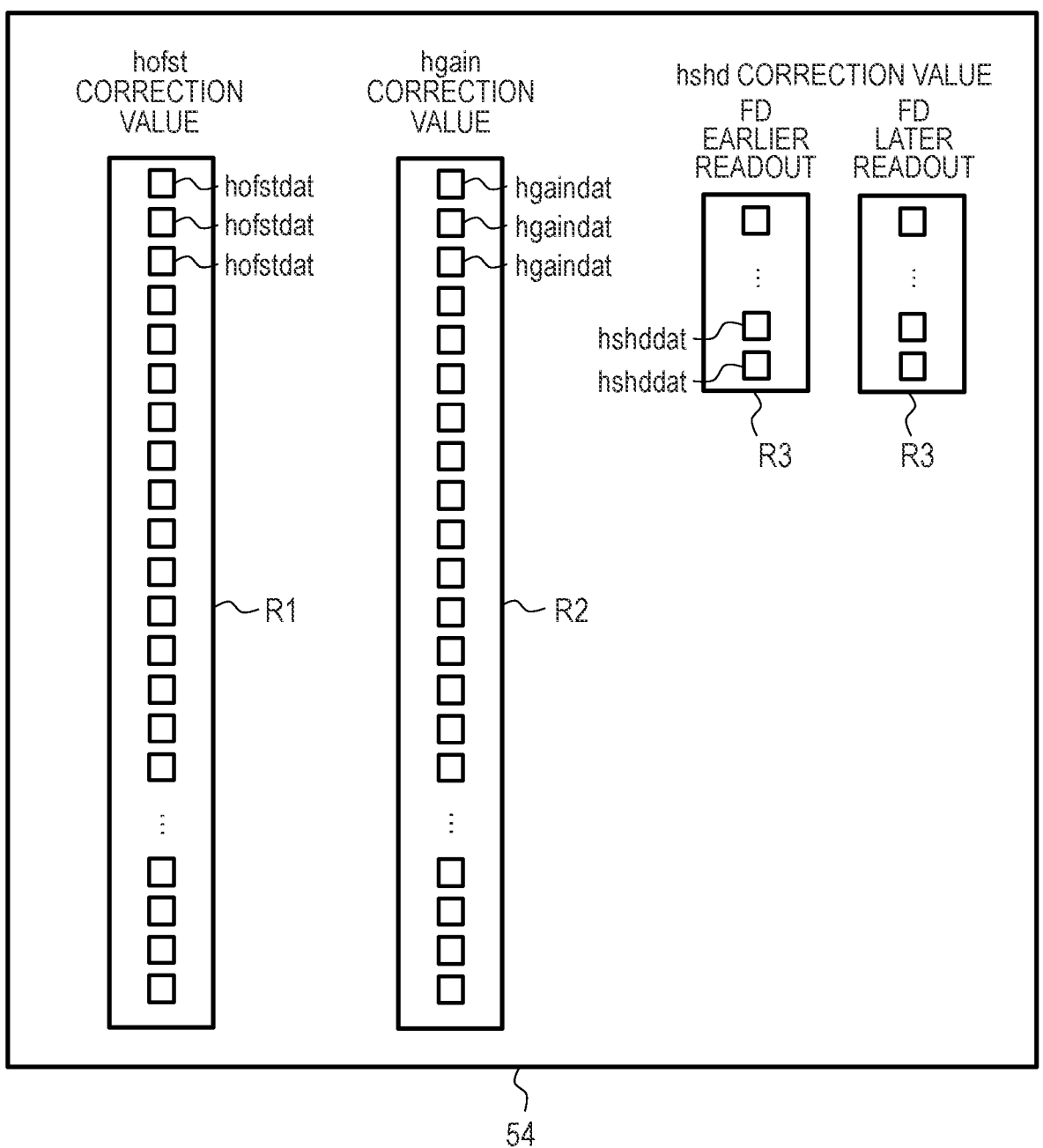
FIG. 15 is a diagram illustrating a configuration example of a first correction value holding unit in the imaging device according to the fifth embodiment of the present invention.
Figure 16:
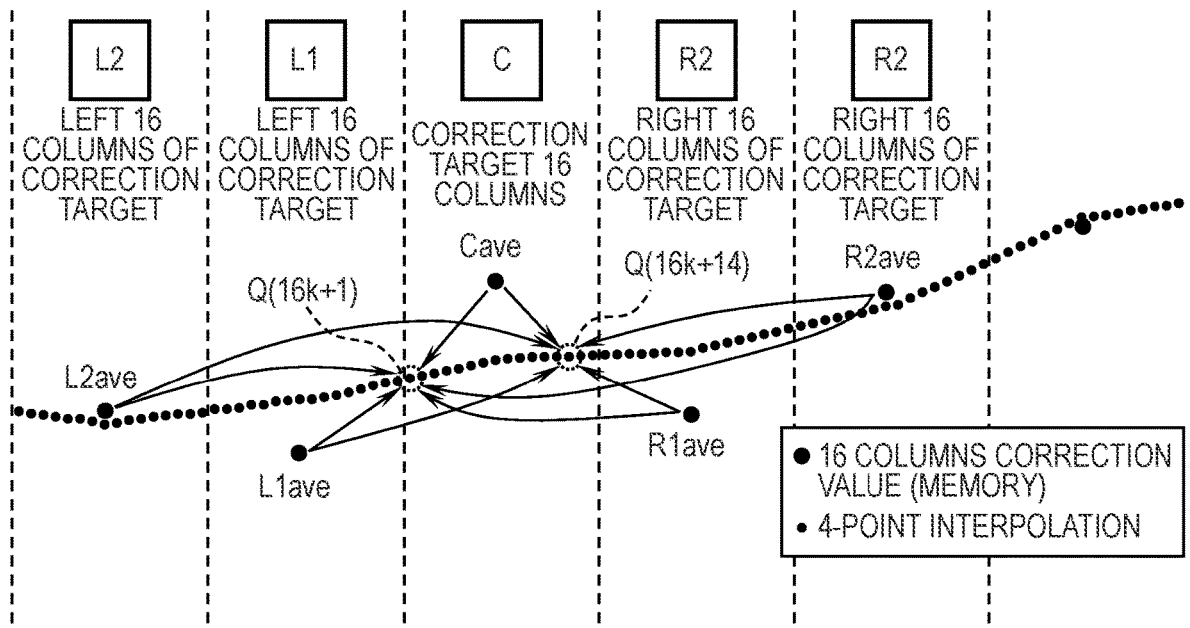
FIG. 16 is a schematic diagram illustrating an operation of a horizontal shading processing unit in the imaging device according to the fifth embodiment of the present invention.

An imaging device according to a fifth embodiment of the present invention will be described with reference to FIG. 13 to FIG. 16. FIG. 13 is a timing chart illustrating a signal readout operation in the imaging device according to the second embodiment. FIG. 14 is a block diagram illustrating a schematic configuration of a signal processing unit in the imaging device according to the present embodiment. FIG. 15 is a diagram illustrating a configuration example of a first correction value holding unit in the imaging device according to the present embodiment. FIG. 16 is a schematic diagram illustrating the operation of the horizontal shading processing unit in the imaging device according to the present embodiment. Components similar to those of the imaging device according to the first to fourth embodiments are denoted by the same reference numerals, and description thereof will be omitted or simplified.

In a configuration in which a pixel includes a plurality of photoelectric conversion elements sharing one floating diffusion as in the imaging device according to the second embodiment, a shading may occur depending on a readout condition of a signal from each photoelectric conversion element due to a structure or the like of the pixel. In the present embodiment, an imaging device capable of effectively correcting such shading will be described.

Before describing a specific noise removal method in the imaging device according to the present embodiment, a signal readout operation by the column circuit unit 30 from the pixel unit 10 in the imaging device according to the second embodiment will be described with reference to FIG. 13. FIG. 13 is a timing chart of an operation of reading out a signal from the pixel unit 10. Here, an operation of reading out signals from the pixels P in the j-th row and the (j+1)-th row by the vertical scanning circuit unit 20 is representatively illustrated. Each signal illustrated in FIG. 13 is a high-active signal.

Immediately before the time t401 at which the readout operation of the pixel P of the j-th row is started, the control signals PSEL (j), PTXA (j), PTXB (j), PSEL (j+1), PTXA (j+1) and PTXB (j+1) are at low-level. The control signals PRES (j) and PRES (j+1) are at high-level.

First, at time t401, the horizontal synchronization signal HSYNC is activated to high-level, and the control signal PSEL (j) of the j-th row, which is the readout target row, is activated to high-level by the vertical scanning circuit unit 20. When the control signal PSEL (j) is activated to high-level, the select transistor M4 of the pixel P in the j-th row which is the row to be read out is turned on, and each of the n-number of pixels P in the j-th row is electrically connected to the vertical output line 14 in the corresponding column.

During the period until the subsequent time t402, the control signal PRES (j) is maintained at high-level by the vertical scanning circuit unit 20, whereby the reset transistor M2 of the pixel P of the j-th row is maintained in an ON state. Thus, the node FD is reset to the voltage VDD.

At time t402, the control signal PRES (j) is inactivated to low-level by the vertical scanning circuit unit 20, and the reset transistor M2 is turned off. Thus, the reset of the node FD is released. Since the select transistor M4 remains in the ON state, a signal (N-signal) corresponding to the gate potential of the amplifier transistor M3 when the reset of the node FD is released is output to the vertical output line 14 of each column.

During a period from time t403 to time t404, the vertical scanning circuit unit 20 activates the control signal PTXA (j) to high-level. Thereby, the transfer transistor M1A is turned on, and charge generated by photoelectric conversion in the photoelectric conversion element PDA is transferred to the node FD. A pixel signal (S-signal) corresponding to the charge generated in the photoelectric conversion element PDA is output to the vertical output line 14 of each column.

At time t404, the vertical scanning circuit unit 20 deactivates the control signal PTXA (j) to low-level. Thereby, the transfer transistor M1A is turned off. Even after the transfer transistor M1A is turned off, the S-level signal is continuously output to the vertical output line 14. Since the readout of signals from the photoelectric conversion element PDA is performed first in the order of using the nodes FD, the readout of signals from the photoelectric conversion element PDA is referred to as FD earlier readout.

Signal readout from the photoelectric conversion element PDB is performed during a period from time t406 to time t410. A specific readout method (driving method) is similar to the readout of the signal from the photoelectric conversion element PDA. Since the readout of signals from the photoelectric conversion element PDB is performed later in the order of using the nodes FD, the readout of signals from the photoelectric conversion element PDB is referred to as FD later readout.

During a period from time t411 to time t412, signals are read from the pixels P in the (j+1)-th row. In the operation example illustrated in FIG. 13, the FD earlier readout and the FD later readout are switched every time the horizontal synchronization signal HSYNC is activated to high-level. However, both the FD earlier readout and the FD later readout may be performed in response to one activation of the horizontal synchronization signal HSYNC.

The pixel signals thus read out to the signal processing unit 50 via the column circuit unit 30 include noise components that change in the horizontal direction (row direction), i.e., noise components that vary between columns. The noise component may depend on, for example, a characteristic variation of a plurality of column circuits constituting the column circuit unit 30 or a characteristic variation of a plurality of memories constituting the memory unit. Further, the noise component may depend on a dark current generated in the photoelectric conversion element, a difference in distance from a plurality of column circuits to the signal processing unit 50, a readout order of signals from the plurality of (predetermined number of) photoelectric conversion elements in the pixel P, a gain variation of the amplifier 32 of each column, and the like.

In the present specification, among variations in noise components, a variation occurring in units of columns is referred to as a column variation, and a variation occurring in larger units is referred to as a horizontal shading for convenience. In the column variation, the noise component generated in the column circuit unit 30 is a main component, and is substantially unaffected by the pixel P. Therefore, the column variation may be regarded as a component that does not depend on readout conditions such as FD earlier readout and FD later readout. The column variation includes noise of an offset component and noise of a gain error component. The noise of the offset component and the noise of the gain error component are low correlation noise for each column, and the horizontal shading is high correlation noise for each column.

Next, horizontal shading will be described. There may be a difference in linear distance from the vertical output line 14 between components involved in the FD earlier readout and components involved in the FD later readout. For example, the linear distance between the photoelectric conversion element and the vertical output line 14 or the linear distance between the gate of the transfer transistor and the vertical output line 14 may be different between the component relating to the FD earlier readout and the component relating to the FD later readout. Therefore, the parasitic capacitance added to the vertical output line 14 may be different between the components relating to the FD earlier readout and the components relating to the FD later readout. Thus, the magnitude of the noise component may be different between the pixel signal obtained by the FD earlier readout and the pixel signal obtained by the FD later readout. In other words, even in the same row, the shape (distribution) of the horizontal shading in the plurality of pixel signals obtained by the FD earlier readout may be different from the shape (distribution) of the horizontal shading in a plurality of pixel signals obtained by the FD later readout. From the above, in order to effectively correct the horizontal shading, it may be said that the FD earlier readout and the FD later readout (that is, the readout order of the signals of the photoelectric conversion elements from the pixels P) may be considered.

Next, a configuration example of the signal processing unit 50 in the imaging device according to the present embodiment will be described with reference to FIG. 14.

As illustrated in FIG. 14, for example, the signal processing unit 50 of the present embodiment may include an identification information generation unit 51, a first processing unit 52, a first correction value holding unit 54, a second processing unit 56, a second correction value generation unit 57, and a second correction value holding unit 58. The first processing unit 52 may include a column offset processing unit 522, a column gain processing unit 524, and a horizontal shading processing unit 526.

The identification information generation unit 51 generates identification information signal PDSEL based on a drive mode information MOCVDE supplied from the control unit 70, and outputs the generated identification information signal PDSEL to the first correction value holding unit 54 and the horizontal shading processing unit 526. The identification information signal PDSEL generated by the identification information generation unit 51 is a signal indicating whether the pixel signal to be corrected has been readout in the FD earlier readout or the FD later readout. The identification information signal PDSEL may also be said to be identification information indicating an object to be read out of a plurality (predetermined number) of photoelectric conversion elements PDA and PDB. Alternatively, the identification information signal PDSEL may also be said to be an information indicating the readout order of each of the plurality (predetermined number) of photoelectric conversion elements PDA and PDB. For example, "0" may be generated as identification information signal PDSEL in the case of the FD earlier readout, and "1" may be generated as identification information signal PDSEL in the case of the FD later readout. It is possible to determine whether the pixel signal to be processed is the FD earlier readout or the FD later readout based on the identification information. The identification information signal PDSEL may be updated, for example, every horizontal synchronization period (hereinafter, "hd").

The first correction value holding unit 54 receives the identification information signal PDSEL from the identification information generation unit 51, and receives and stores the hofst correction value, the hgain correction value, and the hshd data supplied from the outside of the signal processing unit 50.

As schematically illustrated in FIG. 15, for example, the first correction value holding unit 54 may include one first region R1, one second region R2, and third regions R3 of the same number as the number (predetermined number) of photoelectric conversion elements PDA and PDB included in one pixel P. In the first region R1, a plurality of column offset correction values hofstdat may be stored as the hofst correction values respectively corresponding to the plurality of columns of the pixel unit 10. In the second region R2, a plurality of column gain correction values hgaindat may be stored as hgain correction values respectively corresponding to the plurality of columns of the pixel unit 10. Each of the third regions R3 is associated with a readout condition of a signal from each pixel P by the column circuit unit 30. In each of the third regions R3, a plurality of horizontal shading hshd data hshddat may be stored as hshd data corresponding to each of a plurality of groups obtained by dividing a plurality of columns of the pixel unit 10.

In one example, the column gain correction value hgaindat, the column offset correction value hofstdat, and the horizontal shading hshd data hshddat may be generated and supplied to the imaging device 100 before shipment of the imaging device 100. In another example, the column gain correction value hgaindat, the column offset correction value hofstdat, and the horizontal shading hshd data hshddat may be prepared in an external device, generated before shipment of the imaging device 100, and provided or incorporated in the imaging device 100.

The pixel signal Vread read out from the pixel P of the pixel unit 10 by the column circuit unit 30 is supplied to the first processing unit 52 during a period in which a signal is read out from the pixel P of the pixel unit 10. The pixel signal Vread supplied to the first processing unit 52 is input to the column offset processing unit 522.

The column offset processing unit 522 corrects the pixel signal Vread output from the column circuit unit 30 based on the hofst correction value supplied from the first correction value holding unit 54, and generates a pixel signal VhofstOut. For example, the column offset processing unit 522 adds the hofst correction value supplied from the first correction value holding unit 54 to the pixel signal Vread output from the column circuit unit 30. The correction by the column offset processing unit 522 is independent of the value of the identification information signal PDSEL generated by the identification information generation unit 51. That is, the hofst correction value is common between the FD earlier readout and the FD later readout. Assuming that the pixel signal is a signal read out from the photoelectric conversion element PDA or the photoelectric conversion element PDB of the pixel P (i, j), it may be said that the hofst correction value is data associated with the pixel P (i, j). Since the hofst correction value is data for correcting variations in units of columns, variations in units of columns are corrected by the correction by the column offset processing unit 522.

According to the present embodiment, since the first correction value holding unit 54 does not hold the hofst correction value for the FD earlier readout and the hofst correction value for the FD later readout, and holds the common hofst correction value for the FD earlier readout and the FD later readout, the size of the first correction value holding unit 54 may be reduced. The column offset processing unit 522 may be understood as a functional block that performs a first correction based on a plurality of first correction values stored in the first region on a signal read out from a photoelectric conversion element selected by the vertical scanning circuit unit 20 via a plurality of vertical output lines 14 by the column circuit unit 30.

The column gain processing unit 524 corrects the pixel signal VhofstOut output from the column offset processing unit 522 based on the hgain correction value supplied from the first correction value holding unit 54, and generates a pixel signal VhgainOut. For example, the column gain processing unit 524 performs a multiplication process of multiplying the pixel signal VhofstOut output from the column offset processing unit 522 by the hgain correction value supplied from the first correction value holding unit 54. The correction by the column gain processing unit 524 is independent of the value of the identification information signal PDSEL generated by the identification information generation unit 51. That is, the hgain correction value is common between the FD earlier readout and the FD later readout. Assuming that the pixel signal is a signal read out from the photoelectric conversion element PDA or the photoelectric conversion element PDB of the pixel P (i, j), it may be said that the hgain correction value is data associated with the pixel P (i, j). Since the hgain correction value is data for correcting the gain variation in units of columns, the gain variation in units of columns is corrected by the correction by the column gain processing unit 524.

According to the present embodiment, since the first correction value holding unit 54 does not hold the hgain correction value for the FD earlier readout and the hgain correction value for the FD later readout, and holds the common hgain correction value for the FD earlier readout and the FD later readout, the size of the first correction value holding unit 54 may be reduced. The column gain processing unit 524 may be understood as a functional block that performs a second correction on the signal output from the column offset processing unit 522 based on a plurality of second correction values stored in the second region.

The horizontal shading processing unit 526 generates a hshd correction value according to the identification information signal PDSEL based on the hshd data supplied from the first correction value holding unit 54. Then, the pixel signal VhgainOut is corrected using the generated hshd correction value to generate the pixel signal VhshdOut. The horizontal shading processing unit 526 may be understood as a functional block that performs a third correction based on a plurality of third correction values stored in a third region among a predetermined number of third regions according to a readout condition of a signal from a photoelectric conversion element selected by the vertical scanning circuit unit 20.

FIG. 16 schematically illustrates an example of horizontal shading correction in the horizontal shading processing unit 526. In this example, it is assumed that a plurality of columns of the pixel unit 10 are divided into a plurality of groups, and each group includes 16 columns. A plurality of horizontal shading hshd data hshddat are stored in one third region R3 of the first correction value holding unit 54. In the example of FIG. 16, the hshd correction value Q (16 k+n) is generated based on parameters Cave, L2ave, L1ave, R1ave, and R2ave selected from the plurality of horizontal shading hshd data hshddat according to the column number (i value). Then, the pixel signal VhgainOut of the pixel P (i, j) is corrected using the hshd correction value Q (16 k+n) generated in this manner.

Here, the parameter Cave is a horizontal shading hshd data hshddat assigned to the group C to which the pixel P (i, j) belongs. The parameter Cave is, for example, an average value of the signals read out by the column circuit unit 30 from the pixels P arranged in 16 columns constituting the group C. The parameters L2ave and L1ave are horizontal shading hshd data hshddat assigned to the two groups L2 and L1 on the left side of the group C, respectively. The parameter L2ave is an average value of the signals read out by the column circuit unit 30 from the pixels P arranged in 16 columns constituting the group L2. The parameter L1ave is an average value of the signals read out by the column circuit unit 30 from the pixels P arranged in 16 columns constituting the group L1. The parameters R1ave and R2ave are horizontal shading hshd data hshddat assigned to the two groups R1 and R2 on the right side of the group C. The parameter R1ave is an average value of the signals read out by the column circuit unit 30 from the pixels P arranged in 16 columns constituting the group R1. The parameter R2ave is an average value of the signals read out by the column circuit unit 30 from the pixels P arranged in 16 columns constituting the group R2.

In this example, the horizontal shading processing unit 526 generates the hshd correction value Q (16 k+n) by a linear interpolation based on Cave, L2ave, L1ave, R1ave, and R2ave according to the following Equation (7). The horizontal shading processing unit 526 corrects the pixel signal VhgainOut based on the hshd correction value Q (16 k+n). In one example, the horizontal shading processing unit 526 adds the hshd correction value Q (16 k+n) to the pixel signal VhgainOut.

$$Q(16k+n) = \frac{\begin{array}{c}L2_{ave} \times L2[n] + L1_{ave} \times L1[n] + \\ C_{ave} \times C[n] + R1_{ave} \times R1[n] + R2_{ave} \times R2[n]\end{array}}{L2[n] + L1[n] + C[n] + R1[n] + R2[n]} \quad (7)$$

Here, k is an integer, and n is an integer (0 to 15), L1 [n], L2 [n], C [n], R1 [n], and R2 [n] are interpolation parameters.

Among the above-described values, L2ave, L1ave, R1ave, and R2ave may be partially omitted. For example, when the hshd correction value for correcting the pixel signals of the pixels P belonging to the second group from the left end of the pixel unit 10 is generated, L2ave does not exist. In such a case, exception processing such as using L1ave as L2ave may be performed. Note that the processing represented by the Equation (7) is an example, and other equations may be applied or other interpolation methods may be used. According to the present embodiment, the horizontal shading noise dependent on the FD earlier readout and the FD later readout is corrected based on the hshd correction values obtained by interpolation of the hshd data given to the group to which a pixel to be corrected belongs and the groups close thereto. This makes it possible to effectively remove the noise components while reducing the size of the first correction value holding unit 54.

Although the hshd data is assumed to be the horizontal shading hshddat, which is the average value of a plurality of columns, the hshd data may be a correction value corresponding to at least two columns, in which the third region is divided for the FD earlier readout and the FD later readout. Further, although the horizontal shading processing unit 526 generates the hshd correction value from the hshd data acquired from the first correction value holding unit 54, the hshd data may be directly used as the correction value for the processing.

The second correction value generation unit 57 uses the pixel signal VhshdOut output from the first processing unit 52 to generate an obc correction value for correcting the noise of the offset component due to the dark current generated in the pixel unit 10. The second correction value holding unit 58 receives and stores the obc correction value supplied from the second correction value generation unit 57. The second processing unit 56 corrects the pixel signal VhshdOut based on the obc correction value supplied from the second correction value holding unit 58, and generates the pixel signal VobcOut. For example, the second processing unit 56 adds the obc correction value supplied from the second correction value holding unit 58 to the pixel signal VhshdOut output from the first processing unit 52. The correction by the second processing unit 56 is independent of the value of the identification information signal PDSEL generated by the identification information generation unit 51. That is, the obc correction value is common between the FD earlier readout and the FD later readout. Assuming that the pixel signal is a signal read out from the photoelectric conversion element PDA or the photoelectric conversion element PDB of the pixel P (i, j), the obc correction value may be said to be data associated with the pixel P (i, j). Since the obc correction value is data for correcting the noise of the offset component due to the dark current for each pixel, the noise of the offset component due to the dark current generated in the pixel is corrected by the correction by the second processing unit 56.

In the present embodiment, the configuration in which the common obc correction value is held in the FD earlier readout and the FD later readout is assumed, but the present invention is not limited thereto.

As described above, according to the present embodiment, it is possible to appropriately correct noise caused by the pixel circuit and the readout circuit and suppress deterioration of image quality.

Sixth Embodiment

Figure 17:
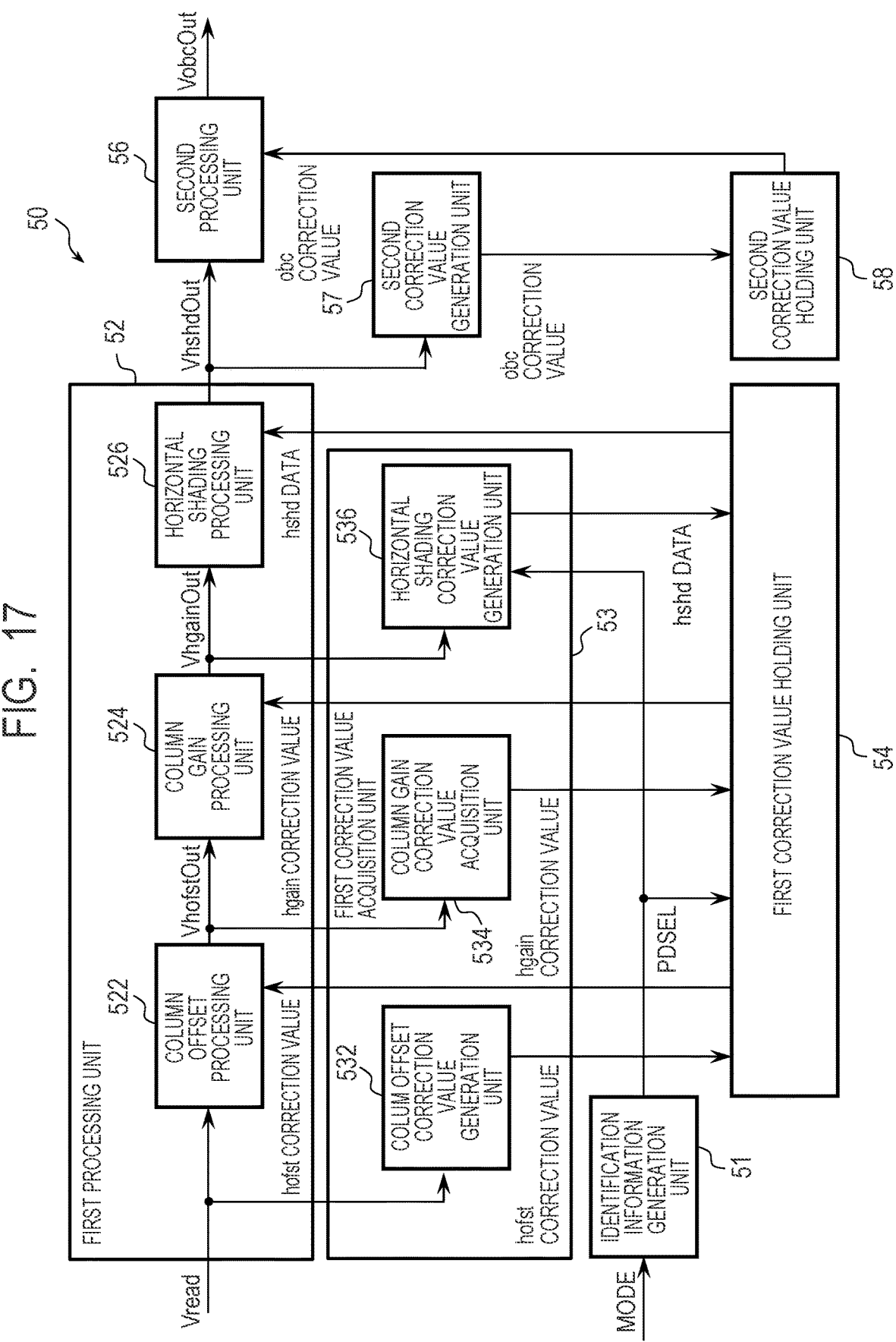
FIG. 17 is a block diagram illustrating a schematic configuration of a signal processing unit in an imaging device according to a sixth embodiment of the present invention.

An imaging device according to a sixth embodiment of the present invention will be described with reference to FIG. 17. FIG. 17 is a block diagram illustrating a configuration example of a signal processing unit in the imaging device according to the present embodiment. Components similar to those of the imaging device according to the first to fifth embodiments are denoted by the same reference numerals, and description thereof will be omitted or simplified.

In the present embodiment, as in the fifth embodiment, a configuration example for correcting shading according to the readout condition of the signal from each photoelectric conversion element in the imaging device including a pixel including a plurality of photoelectric conversion elements sharing one floating diffusion will be described.

As illustrated in FIG. 17, for example, the signal processing unit 50 of the present embodiment may include a first processing unit 52, a first correction value acquisition unit 53, a first correction value holding unit 54, a second processing unit 56, a second correction value holding unit 58, an identification information generation unit 51, and a second correction value generation unit 57. The first processing unit 52 may include a column offset processing unit 522, a column gain processing unit 524, and a horizontal shading processing unit 526. The first correction value acquisition unit 53 may include a column offset correction value generation unit 532, a column gain correction value acquisition unit 534, and a horizontal shading correction value generation unit 536.

The column offset correction value generation unit 532 has a function of generating a hofst correction value for correcting the column variation of the offset component and storing it in the first correction value holding unit 54. The column gain correction value acquisition unit 534 has a function of acquiring a hgain correction value for correcting the column variation of the gain component and storing the hgain correction value in the first correction value holding unit 54. The horizontal shading correction value generation unit 536 has a function of generating hshd data for correcting horizontal shading caused by the FD earlier readout and the FD later readout, and storing the hshd data in the first correction value holding unit 54. The other functional blocks of the signal processing unit 50 are the same as those of the signal processing unit of the fifth embodiment. The control unit 70 may be configured to control the column offset correction value generation unit 532 to execute a correction value generation operation for generating a column offset correction value hofstdat, horizontal shading hshd data hshddat, and an obc correction value.

The pixel signal Vread supplied from the column circuit unit 30 is supplied to the column offset correction value generation unit 532 and the column offset processing unit 522. The column offset correction value generation unit 532 generates a hofst correction value using the pixel signal Vread, and stores the generated hofst correction value in the first correction value holding unit 54. The column offset processing unit 522 generates the pixel signal VhofstOut by processing the pixel signal Vread based on the hofst correction value supplied from the first correction value holding unit 54. Then, the column offset processing unit 522 outputs the generated pixel signal VhofstOut to the column gain correction value acquisition unit 534 and the column gain processing unit 524.

The column gain correction value acquisition unit 534 generates a hgain correction value using the pixel signal VhofstOut, and stores the generated hgain correction value in the first correction value holding unit 54. The column gain processing unit 524 generates the pixel signal VhgainOut by processing the pixel signal VhofstOut based on the hgain correction value supplied from the first correction value holding unit 54. Then, the column gain processing unit 524 outputs the generated pixel signal VhgainOut to the horizontal shading correction value generation unit 536 and the horizontal shading processing unit 526.

The identification information generation unit 51 generates identification information signal PDSEL indicating whether the pixel signal to be corrected has been read in the FD earlier readout or the FD later readout based on the drive mode information MODE supplied from the control unit 70. The identification information generation unit 51 outputs the generated identification information signal PDSEL to the first correction value holding unit 54 and the horizontal shading correction value generation unit 536.

The horizontal shading correction value generation unit 536 generates the hshd data using the pixel signal VhgainOut and the identification information signal PDSEL, and stores the generated hshd data in the first correction value holding unit 54. The horizontal shading processing unit 526 generates the pixel signal VhshdOut by processing the pixel signal VhgainOut based on the hshd data supplied from the first correction value holding unit 54. Then, the horizontal shading processing unit 526 outputs the generated pixel signal VhshdOut to the second correction value generation unit 57 and the second processing unit 56.

The second correction value generation unit 57 generates an obc correction value using the pixel signal VhshdOut output from the first processing unit 52, and stores the generated obc correction value in the second correction value holding unit 58. The second processing unit 56 generates the pixel signal VobcOut by processing the pixel signal VhshdOut output from the first processing unit 52 based on the obc correction value supplied from the second correction value holding unit 58, and outputs the generated pixel signal VobcOut.

In the imaging device according to the present embodiment, prior to the imaging operation, the first correction value acquisition unit 53 may perform the correction value generation operation to generate the hofst correction value and the hshd data. Further, the first correction value acquisition unit 53 may further generate the hgain correction value prior to the imaging operation. By performing the correction value generation operation prior to the imaging operation, it is possible to follow the contents of the correction processing in the signal processing unit 50 with respect to the column variation due to the temperature characteristic, the drive mode change, or the like, the change in the shape of the horizontal shading, and the change in the magnitude of the dark current component. In particular, during the execution of the driving mode in which the power consumption is large or during the change of the driving mode, since the column variation, the change in the shape of the horizontal shading, and the change in the size of the dark current component are large, the effect of changing the correction processing content following the change in the imaging condition is large.

In this example, the correction values acquired and generated by the first correction value acquisition unit 53 and the second correction value generation unit 57 are temporarily stored in the first correction value holding unit 54 and the second correction value holding unit 58, and then supplied to the processing unit, but the obtained and generated correction values may be directly supplied to the processing units.

It is effective to acquire the correction values acquired and generated by the first correction value acquisition unit 53 and the second correction value generation unit 57 in real time in the case of an imaging environment in which the magnitude of noise changes under the influence of heat. The timing of updating the correction value may be appropriately set according to the photographing mode or the ISO sensitivity. Further, it is desirable to appropriately set the timing of updating the correction values in consideration of the time required for obtaining each correction value.

With regard to the imaging mode, for example, the update timing may be different between the time of moving image shooting and the time of still image shooting. For example, at the time of moving image shooting, correction accuracy may be improved by updating the correction value once for each of a plurality of frames in accordance with the time during which the temperature changes. On the other hand, at the time of still image shooting, the correction accuracy may be improved by updating the correction value once every frame. Further, with respect to the ISO sensitivity, since the gain of the column circuit changes for each ISO sensitivity, the correction accuracy may be improved by updating the hgain correction value each time the ISO sensitivity changes.

In consideration of the time required to acquire the correction value, it is desirable that the update timing of the correction value acquired by the first correction value acquisition unit 53 and the update timing of the correction value generated by the second correction value generation unit 57 are set independently of each other. That is, since the second correction value generation unit 57 that generates the correction values for reducing the noise generated in the pixel unit 10 generates the correction values from the pixel values of a plurality of columns and a plurality of rows, the second correction value generation unit 57 may acquire the number of data necessary for generation of correction values in a short time. Therefore, the generation of the correction value in the second correction value generation unit 57 is less subject to time restriction, and it is easy to update the correction value for each frame. On the other hand, since the first correction value acquisition unit 53 that acquires the correction value for reducing the noise generated in the column circuit unit 30 generates the correction value separately for each column, it is necessary to read out a plurality of rows in order to acquire the number of data necessary for generation of the correction value. Therefore, since generation of the correction value in the first correction value acquisition unit 53 causes a reduction in frame rate, it may be difficult to update the correction value for each frame.

As described above, according to the present embodiment, it is possible to appropriately correct noise caused by the pixel circuit and the readout circuit and suppress deterioration of image quality.

Seventh Embodiment

Figure 18:
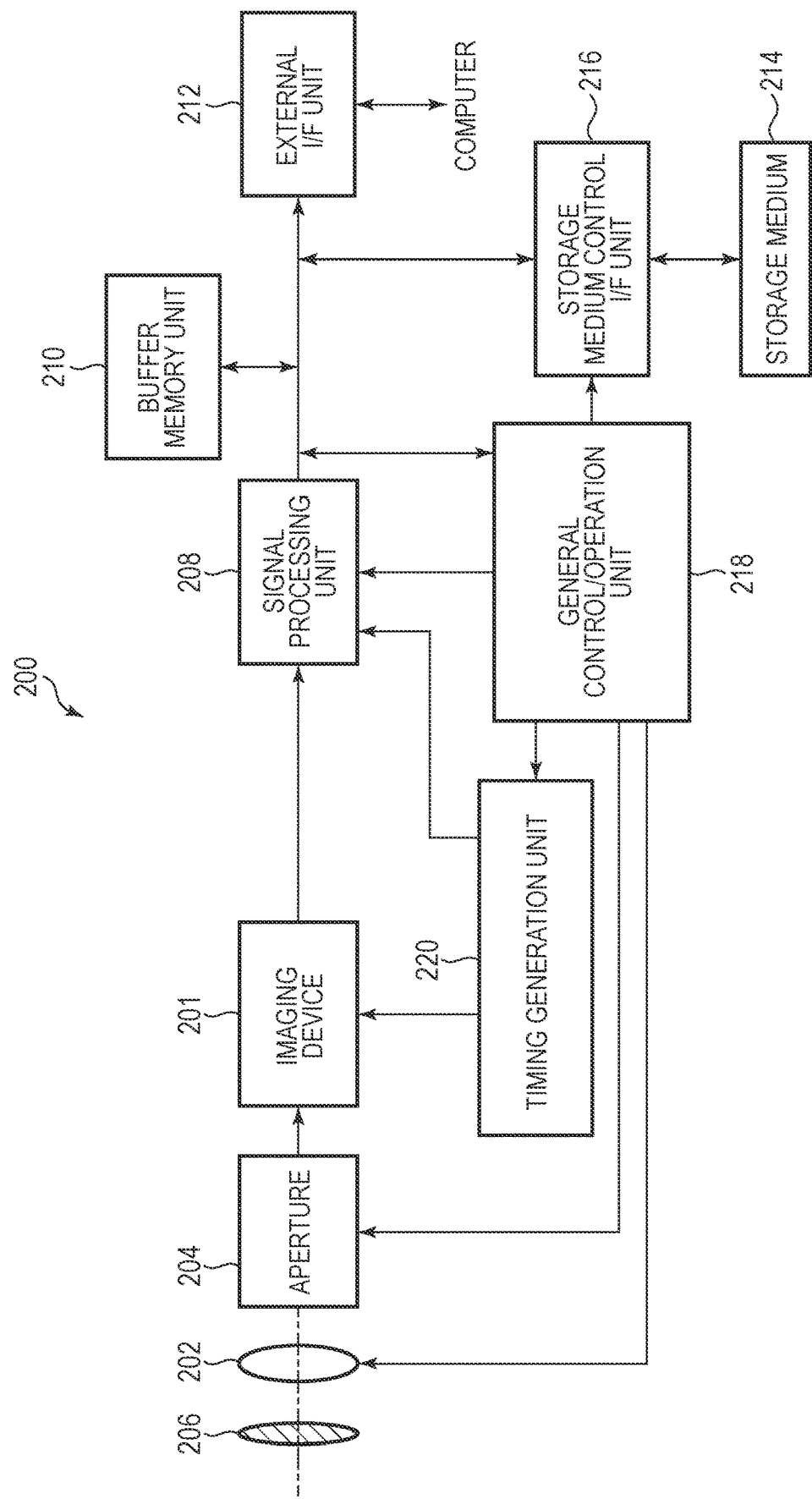
FIG. 18 is a block diagram illustrating a schematic configuration of an imaging system according to a seventh embodiment of the present invention.

An imaging system according to a seventh embodiment of the present invention will be described with reference to FIG. 18. FIG. 18 is a block diagram illustrating a schematic configuration of the imaging system according to the present embodiment.

The imaging device 100 described in the first to sixth embodiments may be applied to various imaging systems. Examples of applicable imaging systems include digital still cameras, digital camcorders, surveillance cameras, copying machines, facsimiles, mobile phones, on-vehicle cameras, observation satellites, and the like. A camera module including an optical system such as a lens and an imaging device is also included in the imaging system. FIG. 18 is a block diagram of a digital still camera as an example of these.

The imaging system 200 illustrated in FIG. 12 includes an imaging device 201, a lens 202 for forming an optical image of a subject on the imaging device 201, an aperture 204 for varying the amount of light passing through the lens 202, and a barrier 206 for protecting the lens 202. The lens 202 and the aperture 204 form an optical system that collects light on the imaging device 201. The imaging device 201 is the imaging device 100 described in any of the first to sixth embodiments, and converts an optical image formed by the lens 202 into image data.

The imaging system 200 also includes a signal processing unit 208 that processes signals output from the imaging device 201. The signal processing unit 208 generates image data from a digital signal output from the imaging device 201. The signal processing unit 208 performs various corrections and compressions as necessary and outputs the processed image data. The signal processing unit 208 may include a part of the functions of the imaging device 100. For example, the signal processing unit 208 may include the function of the ADC 34 or the function of the signal processing unit 50 (the first processing unit 52 and the second processing unit 56) among the functions of the imaging device 100 described in the first to sixth embodiments.

The imaging system 200 further includes a buffer memory unit 210 for temporarily storing image data, and an external interface unit (external I/F unit) 212 for communicating with an external computer or the like. The imaging system 200 further includes a storage medium 214 such as a semiconductor memory for storing or reading out the imaging data, and a storage medium control interface unit (storage medium control I/F unit) 216 for storing or reading out the imaging data on or from the storage medium 214. The storage medium 214 may be built in the imaging system 200, or may be detachable.

The imaging system 200 further includes a general control/operation unit 218 that controls various calculations and operations of the entire digital still camera, and a timing generation unit 220 that outputs various timing signals to the imaging device 201 and the signal processing unit 208. Here, the timing signal or the like may be input from the outside, and the imaging system 200 may include at least the imaging device 201 and the signal processing unit 208 that processes an output signal output from the imaging device 201.

The imaging device 201 outputs the imaging signal to the signal processing unit 208. The signal processing unit 208 performs predetermined signal processing on the imaging signal output from the imaging device 201, and outputs image data. The signal processing unit 208 generates an image using the imaging signal.

As described above, according to the present embodiment, it is possible to realize an imaging system to which the imaging device 100 according to the first to sixth embodiments is applied.

Eighth Embodiment

Figure 19A:
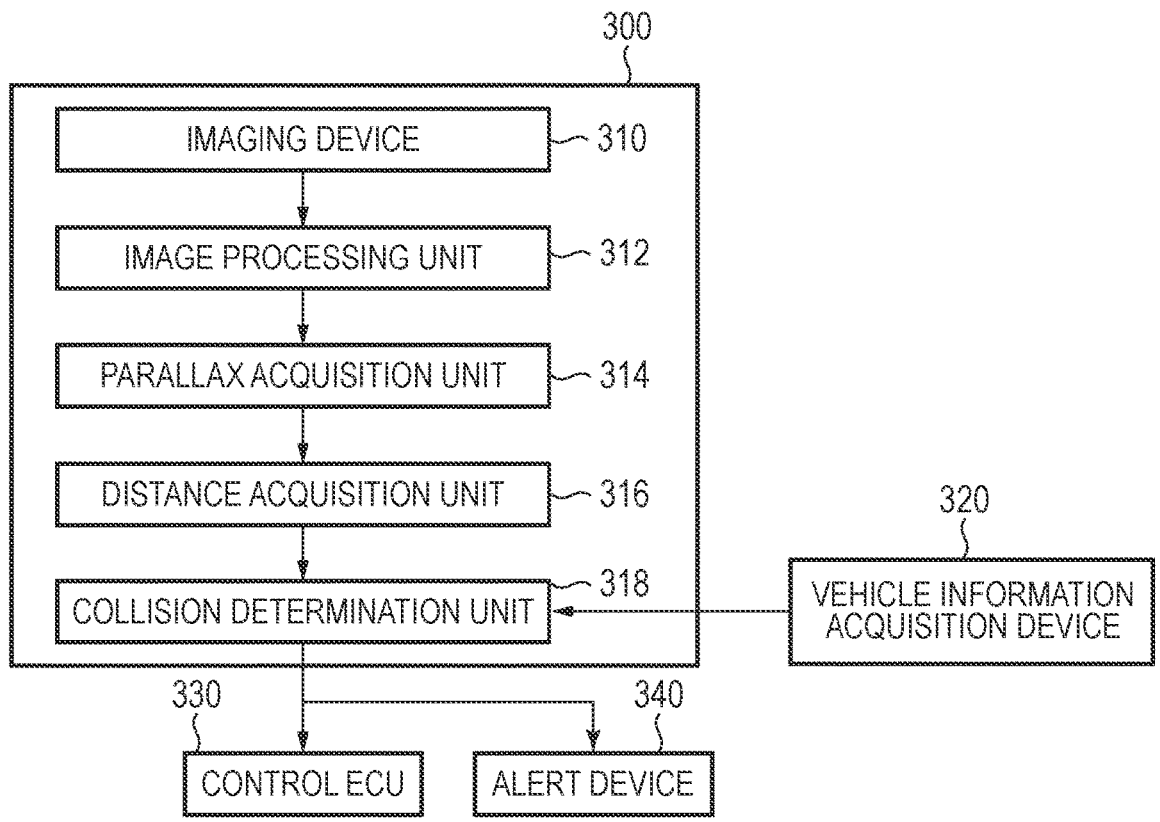
FIG. 19A is a diagram illustrating a configuration example of an imaging system according to an eighth embodiment of the present invention.
Figure 19B:
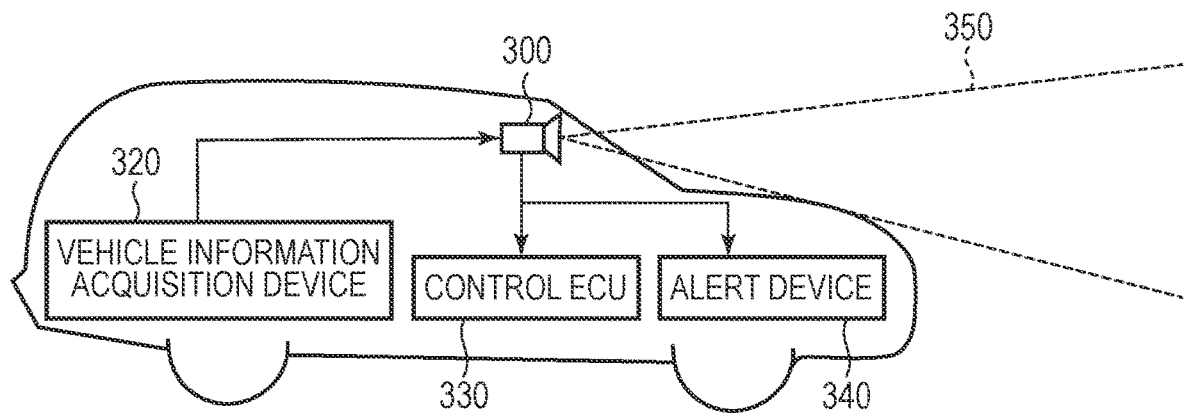
FIG. 19B is a diagram illustrating a configuration example of a movable object according to the eighth embodiment of the present invention.

An imaging system and a movable object according to an eighth embodiment of the present invention will be described with reference to FIG. 19A and FIG. 19B. FIG. 19A is a diagram illustrating the configuration of the imaging system according to the present embodiment. FIG. 19B is a diagram illustrating the configuration of the movable object according to the present embodiment.

FIG. 19A illustrates an example of an imaging system relating to an on-vehicle camera. The imaging system 300 includes an imaging device 310. The imaging device 310 may be the imaging device 100 described in any of the first to sixth embodiments. The imaging system 300 includes an image processing unit 312 that performs image processing on a plurality of image data acquired by the imaging device 310, and a parallax acquisition unit 314 that calculates parallax (phase difference of parallax images) from the plurality of image data acquired by the imaging device 310. The imaging system 300 includes a distance acquisition unit 316 that calculates a distance to an object based on the calculated parallax, and a collision determination unit 318 that determines whether or not there is a possibility of collision based on the calculated distance. Here, the parallax acquisition unit 314 and the distance acquisition unit 316 are examples of a distance information acquisition unit that acquires distance information to the object. That is, the distance information may be information on a parallax, a defocus amount, a distance to the object, and the like. The collision determination unit 318 may determine the collision possibility using any of these pieces of distance information. The distance information acquisition unit may be implemented by dedicated hardware or software modules. Further, it may be implemented by FPGA (Field Programmable Gate Array), ASIC (Application Specific Integrated circuit), or the like, or may be implemented by a combination of these.

The imaging system 300 is connected to a vehicle information acquisition device 320, and may acquire vehicle information such as a vehicle speed, a yaw rate, and a steering angle. Further, the imaging system 300 is connected to a control ECU 330 which is a control device that outputs a control signal for generating a braking force to the vehicle based on the determination result of the collision determination unit 318. The imaging system 300 is also connected to an alert device 340 that issues an alert to the driver based on the determination result of the collision determination unit 318. For example, when the collision possibility is high as the determination result of the collision determination unit 318, the control ECU 330 performs vehicle control to avoid collision and reduce damage by braking, returning an accelerator, suppressing engine output, or the like. The alert device 340 alerts a user by sounding an alarm such as a sound, displaying alert information on a screen of a car navigation system or the like, or giving vibration to a seat belt or a steering wheel.

In the present embodiment, the imaging system 300 images the periphery of the vehicle, for example, the front or the rear. FIG. 19B illustrates an imaging system in the case of imaging an image in front of a vehicle (an imaging range 350). The vehicle information acquisition device 320 sends an instruction to the imaging system 300 or the imaging device 310. With such a configuration, the accuracy of distance measurement may be further improved.

In the above description, an example has been described in which control is performed so as not to collide with other vehicles, but the present invention is also applicable to control of automatic driving following other vehicles, control of automatic driving so as not to go out of a lane, and the like. Further, the imaging system is not limited to a vehicle such as a host vehicle, and may be applied to, for example, a movable object (moving device) such as a ship, an aircraft, or an industrial robot. In addition, the present invention may be applied not only to a movable object but also to a wide variety of equipment such as an ITS (Intelligent Transport Systems).

Ninth Embodiment

Figure 20:
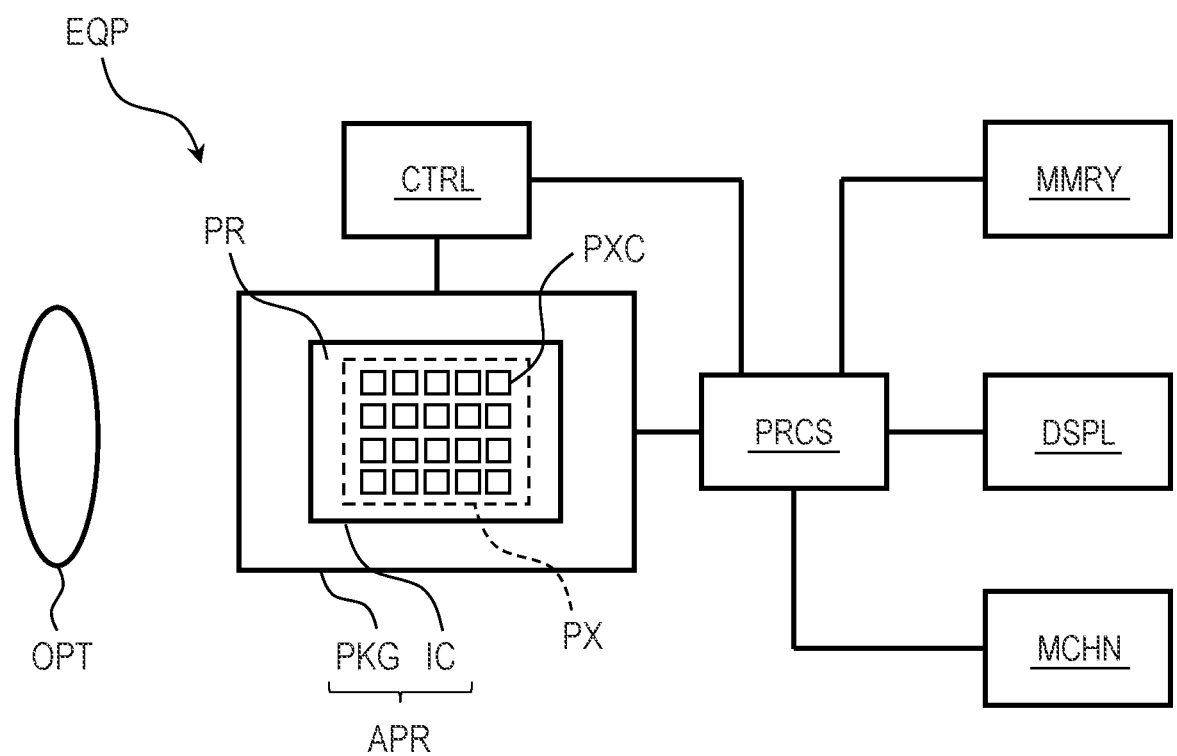
FIG. 20 is a block diagram illustrating a schematic configuration of equipment according to a ninth embodiment of the present invention.

Equipment according to a ninth embodiment of the present invention will be described with reference to FIG. 20. FIG. 20 is a block diagram illustrating a schematic configuration of equipment according to the present embodiment.

FIG. 20 is a schematic diagram illustrating equipment EQP including the photoelectric conversion device APR. The photoelectric conversion device APR has the function of the imaging device 100 described in any of the first to sixth embodiments. All or a part of the photoelectric conversion device APR is a semiconductor device IC. The photoelectric conversion device APR of this example may be used, for example, as an image sensor, an AF (Auto Focus) sensor, a photometry sensor, or a distance measurement sensor. The semiconductor device IC includes a pixel area PX in which pixel circuits PXC including photoelectric conversion units are arranged in a matrix. The semiconductor device IC may include a peripheral area PR around the pixel area PX. Circuits other than the pixel circuits may be arranged in the peripheral area PR.

The photoelectric conversion device APR may have a structure (chip stacked structure) in which a first semiconductor chip provided with a plurality of photoelectric conversion units and a second semiconductor chip provided with peripheral circuits are stacked. Each peripheral circuit in the second semiconductor chip may be a column circuit corresponding to a pixel column of the first semiconductor chip. The peripheral circuits in the second semiconductor chip may be matrix circuits corresponding to the pixels or the pixel blocks of the first semiconductor chip. As a connection between the first semiconductor chip and the second semiconductor chip, a TSV (Through Silicon Via), an inter-chip interconnection by direct bonding of a conductor such as copper, a connection by micro bumps between chips, a connection by wire bonding, or the like may be adopted.

In addition to the semiconductor device IC, the photoelectric conversion device APR may include a package PKG that accommodates the semiconductor device IC. The package PKG may include a base body to which the semiconductor device IC is fixed, a lid body made of glass or the like facing the semiconductor device IC, and a connection member such as a bonding wire or a bump that connects a terminal provided on the base body to a terminal provided on the semiconductor device IC.

The equipment EQP may further comprise at least one of an optical device OPT, a control device CTRL, a processing device PRCS, a display device DSPL, a storage device MMRY, and a mechanical device MCHN. The optical device OPT corresponds to the photoelectric conversion device APR as a photoelectric conversion device, and is, for example, a lens, a shutter, or a mirror. The control device CTRL controls the photoelectric conversion device APR, and is, for example, a semiconductor device such as an ASIC. The processing device PRCS processes a signal output from the photoelectric conversion device APR, and constitutes an AFE (analog front end) or a DFE (digital front end). The processing unit PRCS is a semiconductor device such as a CPU (Central Processing Unit) or an ASIC. The display device DSPL may be an EL (electroluminescent) display device or a liquid crystal display device which displays information (images) obtained by the photoelectric conversion device APR. The storage device MMRY may be a magnetic device or a semiconductor device that stores information (images) obtained by the photoelectric conversion device APR. The storage device MMRY may be a volatile memory such as an SRAM or a DRAM, or a nonvolatile memory such as a flash memory or a hard disk drive. The mechanical device MCHN includes a movable portion or a propulsion portion such as a motor or an engine. In the equipment EQP, a signal output from the photoelectric conversion device APR may be displayed on the display device DSPL, and is transmitted to the outside by a communication device (not illustrated) included in the equipment EQP. Therefore, it is preferable that the equipment EQP further includes a storage device MMRY and a processing device PRCS separately from the storage circuit unit and the arithmetic circuit unit included in the photoelectric conversion device APR.

The equipment EQP illustrated in FIG. 20 may be an electronic device such as an information terminal (for example, a smartphone or a wearable terminal) having a photographing function or a camera (for example, an interchangeable lens camera, a compact camera, a video camera, and a surveillance camera.). The mechanical device MCHN in the camera may drive components of the optical device OPT for zooming, focusing, and shutter operation. The equipment EQP may be a transportation device (movable object) such as a vehicle, a ship, or an airplane. The equipment EQP may be a medical device such as an endoscope or a CT scanner.

The mechanical device MCHN in the transport device may be used as a mobile device. The equipment EQP as a transport device is suitable for transporting the photoelectric conversion device APR, or for assisting and/or automating operation (manipulation) by an imaging function. The processing device PRCS for assisting and/or automating operation (manipulation) may perform processing for operating the mechanical device MCHN as a mobile device based on information obtained by the photoelectric conversion device APR.

The photoelectric conversion device APR according to the present embodiment may provide the designer, the manufacturer, the seller, the purchaser, and/or the user with high value. Therefore, when the photoelectric conversion device APR is mounted on the equipment EQP, the value of the equipment EQP may be increased. Therefore, in order to increase the value of the equipment EQP, it is advantageous to determine the mounting of the photoelectric conversion device APR of the present embodiment on the equipment EQP when the equipment EQP is manufactured and sold.

Modified Embodiments

The present invention is not limited to the above-described embodiment, and various modifications are possible.

For example, an example in which some of the configurations of any of the embodiments are added to other embodiments or an example in which some of the configurations of any of the embodiments are substituted with some of the configurations of the other embodiments are also an embodiment of the present invention.

In the first to sixth embodiments, the imaging device 100 has the functions of the first processing unit 52 and the second processing unit 56 of the signal processing unit 50, but it is not necessary that the imaging device 100 includes these functions. That is, at least one of the functions of the first processing unit 52 and the second processing unit 56 may be provided in a device different from the imaging device 100. The other device may be, for example, a signal processing device such as a personal computer including a processor (e.g., CPU or MPU) different from the imaging device 100. Alternatively, the other device may be a circuit such as an ASIC that realizes at least one of the functions of the first processing unit 52 and the second processing unit 56.

Although the first to sixth embodiments have exemplified the noise generated in the amplifier 32 as the noise of the gain component generated in the column circuit unit 30, the noise of the gain component generated in the column circuit unit 30 may also be generated in the comparator included in the ADC 34. The noise of the gain component corrected by the first processing unit 52 may be a noise generated in the ADC 34, or both the noise generated in the amplifier 32 and the noise generated in the ADC 34.

The imaging systems described in the seventh and eighth embodiments are examples of imaging systems to which the photoelectric conversion device of the present invention may be applied, and imaging systems to which the photoelectric conversion device of the present invention may be applied are not limited to the configurations illustrated in FIG. 18 and FIG. 19A.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-077472, filed May 10, 2022, and Japanese Patent Application No. 2023-026048, filed Feb. 22, 2023, which are hereby incorporated by reference herein in their entirety.

What is claimed is:

1. A photoelectric conversion device comprising:
a plurality of pixels arranged to form a plurality of columns;
a plurality of column circuits provided corresponding to the plurality of columns and each configured to read out a signal acquired by a pixel of the corresponding column;
a first processing unit configured to perform an arithmetic processing on each of the signals output from the plurality of column circuits, the arithmetic processing including a processing of reducing a gain error component of the column circuit generated in the column circuit and superimposed on the signal; and
a second processing unit configured to perform an arithmetic processing of reducing a noise generated in the pixel and superimposed on the signal on the signals processed by the first processing unit.

2. The photoelectric conversion device according to claim 1, wherein the processing of reducing the gain error component includes a division arithmetic processing.

3. The photoelectric conversion device according to claim 1, wherein the processing of reducing the gain error component includes a multiplication arithmetic processing.

4. The photoelectric conversion device according to claim 1, wherein the processing of reducing the gain error component includes an arithmetic processing using a correction value table.

5. The photoelectric conversion device according to claim 1,
wherein at least a part of the plurality of pixels includes a first sub-pixel including a first photoelectric conversion element and a second sub-pixel including a second photoelectric conversion element, and
wherein the second processing unit is configured to perform the arithmetic processing using a first correction value on a signal acquired by the first sub-pixel of the part of the plurality of pixels, and perform the arithmetic processing using a second correction value on a signal acquired by the second sub-pixel of the part of the plurality of pixels.

6. The photoelectric conversion device according to claim 1,
wherein the plurality of pixels includes a first pixel and a second pixel having different optical characteristics in the same column, and
wherein the second processing unit is configured to perform the arithmetic processing using a first correction value on a signal acquired by the first pixel, and perform the arithmetic processing using a second correction value on a signal acquired by the second pixel.

7. The photoelectric conversion device according to claim 6 further comprising a plurality of output lines each connected to a pixel of a corresponding column, each of the plurality of columns including at least two of the plurality of output lines,
wherein the plurality of column circuits is provided corresponding to each of the plurality of output lines,
wherein the first pixel is connected to a first column circuit of the plurality of column circuits via a first output line of the plurality of output lines, and
wherein the second pixel is connected to a second column circuit of the plurality of column circuits via a second output line of the plurality of output lines.

8. The photoelectric conversion device according to claim 7, wherein the first processing unit and the second processing unit includes a first set of the first processing unit and the second processing unit that performs the arithmetic processing on a signal processed by the first column circuit, and a second set of the first processing unit and the second processing unit that performs the arithmetic processing on a signal processed by the second column circuit.

9. The photoelectric conversion device according to claim 1,
wherein the first processing unit is configured to perform the arithmetic processing using a common correction value for each a first number of signals, and
wherein the second processing unit is configured to perform the arithmetic processing using a common correction value for each a second number of signals independent of the first number.

10. The photoelectric conversion device according to claim 1, wherein the arithmetic processing in the first processing unit includes a processing for performing linearity correction.

11. The photoelectric conversion device according to claim 1 further comprising a first correction value acquisition unit configured to acquire a correction value used in the arithmetic processing in the first processing unit,
wherein the first correction value acquisition unit is configured to acquire the correction value from an outside of the photoelectric conversion device.

12. The photoelectric conversion device according to claim 1 further comprising a first correction value acquisition unit configured to acquire a correction value used in the arithmetic processing in the first processing unit,
wherein the first correction value acquisition unit is configured to acquire the correction value generated inside the photoelectric conversion device.

13. The photoelectric conversion device according to claim 11 further comprising a first correction value holding unit configured to hold the correction value used in the arithmetic processing in the first processing unit.

14. The photoelectric conversion device according to claim 13, wherein the first correction value holding unit holds the same number of correction values as the number of the plurality of columns.

15. The photoelectric conversion device according to claim 13, wherein the correction value used in the arithmetic processing in the first processing unit is obtained by the first correction value acquisition unit and stored in the first correction value holding unit.

16. The photoelectric conversion device according to claim 11, wherein the arithmetic processing in the first processing unit includes at least one of an arithmetic processing of reducing a noise that is superimposed on a signal output from the column circuit and has low correlation for each column, and an arithmetic processing of reducing a noise having high correlation for each column.

17. The photoelectric conversion device according to claim 16, wherein the first processing unit is configured to perform the processing of reducing the gain error component of the column circuit on a signal subjected to the arithmetic processing of reducing the noise having low correlation for each column.

18. The photoelectric conversion device according to claim 17, wherein the first correction value acquisition unit is configured to generate correction values used in the arithmetic processing of reducing the noise having low correlation for each column corresponding to each column from a signal before performing the processing of reducing the gain error component of the column circuit.

19. The photoelectric conversion device according to claim 16, wherein the first processing unit is configured to perform the arithmetic processing of reducing the noise having high correlation for each column on a signal subjected to the processing of reducing the gain error component of the column circuit.

20. The photoelectric conversion device according to claim 19, wherein the first correction value acquisition unit is configured to generate correction values used in the arithmetic processing of reducing the noise having high correlation for each column corresponding to at least two or more columns from a signal subjected to the processing of reducing the gain error component of the column circuit.

21. The photoelectric conversion device according to claim 1 further comprises a second correction value generation unit configured to generate a correction value used in the arithmetic processing in the second processing unit.

22. The photoelectric conversion device according to claim 21, wherein the second correction value generation unit is configured to generate the correction value from the pixel value corrected by the first processing unit.

23. The photoelectric conversion device according to claim 21 further comprising a second correction value holding unit configured to hold the correction value used in the arithmetic processing in the second processing unit.

24. The photoelectric conversion device according to claim 23, wherein the correction value used in the arithmetic processing in the second processing unit is generated by the second correction value generation unit and stored in the second correction value holding unit.

25. The photoelectric conversion device according to claim 1, wherein the arithmetic processing in the second processing unit includes a processing of reducing a noise of an offset component.

26. The photoelectric conversion device according to claim 1, wherein each of the plurality of column circuits includes an amplifier or a comparator.

27. The photoelectric conversion device according to claim 1 further comprising:
a first substrate provided with the plurality of pixels; and
a second substrate stacked on the first substrate and provided with the plurality of column circuits, the first processing unit, and the second processing unit.

28. A photoelectric conversion device comprising:
a plurality of pixels arranged to form a plurality of columns;
a plurality of column circuits provided corresponding to the plurality of columns and each configured to read out a signal acquired by a pixel of the corresponding column;
a first processing unit configured to perform an arithmetic processing including multiplication of reducing a noise generated in the column circuit and superimposed on a signal on each of signals output from the plurality of column circuits; and
a second processing unit configured to perform an arithmetic processing of reducing a noise generated in the pixel and superimposed on the signal on the signals processed by the first processing unit.

29. An imaging system comprising:
the photoelectric conversion device according to claim 1; and
a signal processing device configured to process a signal output from the photoelectric conversion device.

30. A movable object comprising:
the photoelectric conversion device according to claim 1;
a distance information acquisition unit configured to acquire distance information to an object from a parallax image based on a signal from the photoelectric conversion device; and
a control unit configured to control the movable object based on the distance information.

31. Equipment comprising:
the photoelectric conversion device according to claim 1, and
at least one of
an optical device corresponding to the photoelectric conversion device,
a control device configured to control the photoelectric conversion device,
a processing device configured to process a signal output from the photoelectric conversion device,
a mechanical device that is controlled based on information obtained by the photoelectric conversion device, a display device configured to display information obtained by the photoelectric conversion device, and a storage device configured to store information obtained by the photoelectric conversion device.

32. A signal processing device for processing a signal output from a photoelectric conversion device including a plurality of pixels arranged to form a plurality of columns, and a plurality of column circuits provided corresponding to the plurality of columns and each configured to read out a signal acquired by a pixel of the corresponding column, the signal processing device comprising:

a first processing unit configured to perform an arithmetic processing on each of the signals output from the plurality of column circuits of the photoelectric conversion device, the arithmetic processing including a processing of reducing a gain error component of the column circuit generated in the column circuit and superimposed on the signal; and a second processing unit configured to perform an arithmetic processing of reducing a noise generated in the pixel and superimposed on the signal on the signals processed by the first processing unit.

33. A signal processing method for processing a signal output from a photoelectric conversion device including a plurality of pixels arranged to form a plurality of columns, and a plurality of column circuits provided corresponding to the plurality of columns and each configured to read out a signal acquired by a pixel of the corresponding column, the method comprising:

performing a first processing including an arithmetic processing on each of the signals output from the plurality of column circuits of the photoelectric conversion device, the arithmetic processing including a processing of reducing a gain error component of the column circuit generated in the column circuit and superimposed on the signal; and performing a second processing including an arithmetic processing of reducing a noise generated in the pixel and superimposed on the signal on the signals processed by the first processing unit.

* * * * *